US010353383B2

(12) United States Patent
Maruno et al.

(10) Patent No.: US 10,353,383 B2
(45) Date of Patent: Jul. 16, 2019

(54) SIMULATOR, SIMULATION METHOD, AND SIMULATION PROGRAM

(71) Applicant: OMRON Corporation, Kyoto-shi, Kyoto (JP)

(72) Inventors: Ryota Maruno, Kusatsu (JP); Yasunori Sakaguchi, Takatsuki (JP); Haruna Shimakawa, Kyoto (JP)

(73) Assignee: OMRON Corporation, Kyoto-shi (JP)

( * ) Notice: Subject to any disclaimer, the term of this patent is extended or adjusted under 35 U.S.C. 154(b) by 250 days.

(21) Appl. No.: 15/366,716

(22) Filed: Dec. 1, 2016

(65) Prior Publication Data

US 2017/0235300 A1    Aug. 17, 2017

(30) Foreign Application Priority Data

Nov. 18, 2015  (JP) ................................ 2015-225784

(51) Int. Cl.
*G06T 17/00*  (2006.01)
*G05B 19/418*  (2006.01)
(Continued)

(52) U.S. Cl.
CPC ..... *G05B 19/4189* (2013.01); *G05B 19/4182* (2013.01); *G05B 19/41885* (2013.01);
(Continued)

(58) Field of Classification Search
None
See application file for complete search history.

(56) References Cited

U.S. PATENT DOCUMENTS 7,881,917 B2 * 2/2011 Nagatsuka ............. B25J 9/1671
703/6
8,589,122 B2 * 11/2013 Nagatsuka ......... G05B 19/4069
703/1
(Continued)

FOREIGN PATENT DOCUMENTS

CN         1939678 A     4/2007
CN       101097440 A     1/2008
(Continued)

OTHER PUBLICATIONS

Japanese Office Action dated Sep. 25, 2018 in a counterpart Japanese Patent application.
(Continued)

*Primary Examiner* — Michael Lebentritt
(74) *Attorney, Agent, or Firm* — Metrolexis Law Group, PLLC

(57) ABSTRACT

The simulation reflects the actual behavior of a target in an application involving a target near a transporting surface of a carrier instead of being placed directly on the transporting surface. A simulator includes a creating unit that virtually creates a system in a three-dimensional virtual space, a tracking unit that updates positions of targets on the transporting surface in the three-dimensional virtual space based on a corresponding movement of the carrier, and updates a position of a target picked up by the processing device in association with a behavior of the processing device, and an instruction generation unit that generates a control instruction for the behavior of the processing device based on the position of each target. When the processing device places a target within a predetermined range from the transporting surface, the tracking unit associates the target with the transporting surface and updates a position of the target.

10 Claims, 19 Drawing Sheets

(51) Int. Cl.
*G06T 7/73* (2017.01)
*G06T 7/246* (2017.01)

(52) U.S. Cl.
CPC .............. *G06T 7/246* (2017.01); *G06T 7/248* (2017.01); *G06T 7/74* (2017.01); *G06T 17/00* (2013.01); *G05B 2219/31227* (2013.01); *G05B 2219/32337* (2013.01); *G05B 2219/39106* (2013.01); *G05B 2219/40007* (2013.01); *G06T 2200/04* (2013.01); *G06T 2200/24* (2013.01); *G06T 2207/10016* (2013.01); *G06T 2207/30164* (2013.01); *Y02P 90/083* (2015.11); *Y02P 90/26* (2015.11)

(56) References Cited

U.S. PATENT DOCUMENTS

| | | | |
|---|---|---|---|
| 2007/0073444 | A1 | 3/2007 | Kobayashi et al. |
| 2007/0299642 | A1* | 12/2007 | Kondo ................ G06F 17/5009 703/6 |
| 2013/0311154 | A1 | 11/2013 | Atohira |
| 2013/0329954 | A1 | 12/2013 | Ikeda et al. |
| 2013/0335405 | A1* | 12/2013 | Scavezze ................ G06T 19/20 345/419 |
| 2014/0088949 | A1* | 3/2014 | Moriya .................. G05B 17/02 703/22 |
| 2014/0214375 | A1 | 7/2014 | Kawahito |
| 2014/0249667 | A1 | 9/2014 | Suzuki |
| 2015/0161808 | A1* | 6/2015 | Oya .................... G05B 19/0426 345/633 |
| 2017/0139407 | A1* | 5/2017 | Sakaguchi ....... G05B 19/41885 |
| 2017/0140521 | A1* | 5/2017 | Sakaguchi .......... G06K 9/00335 |
| 2017/0323449 | A1* | 11/2017 | Aonuma ................ G06T 19/006 |
| 2018/0088207 | A1* | 3/2018 | Feil ............................ G01S 1/70 |

FOREIGN PATENT DOCUMENTS

| | | |
|---|---|---|
| CN | 103425053 A | 12/2013 |
| CN | 103676662 A | 3/2014 |
| CN | 103703424 A | 4/2014 |
| CN | 103970594 A | 8/2014 |
| EP | 2653414 A1 | 10/2013 |
| EP | 2843556 A1 | 3/2015 |
| JP | H09-258815 A | 10/1997 |
| JP | 2013-191128 A | 9/2013 |
| JP | 2013-256349 A | 12/2013 |

OTHER PUBLICATIONS

Extended European search report dated May 29, 2017 in the counterpart European patent application.
Chinese Office Action dated Nov. 2, 2018 in a counterpart Chinese Patent Application.
The Chinese Office Action dated Mar. 29, 2019 in a counterpart Chinese Patent Application.

* cited by examiner

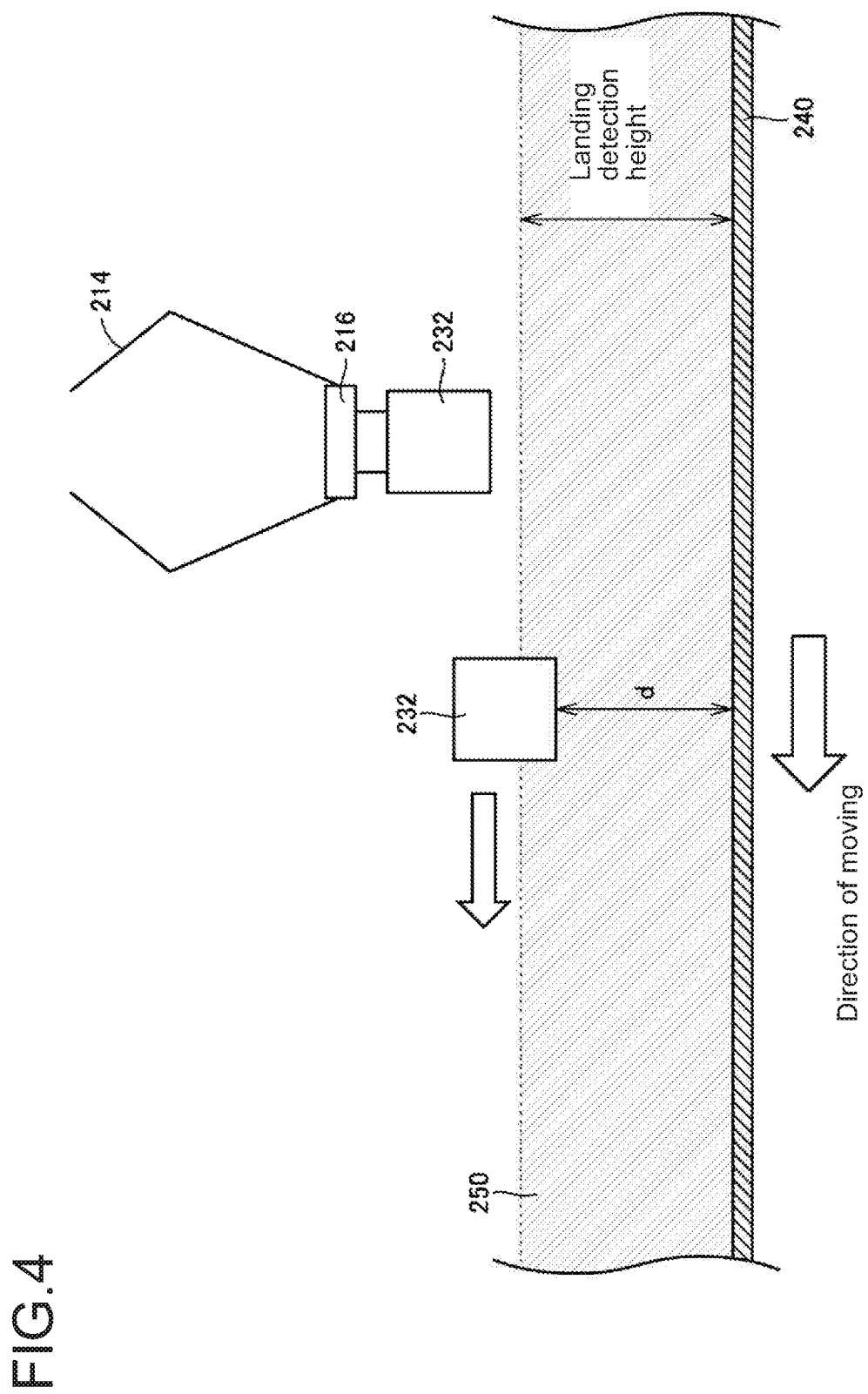

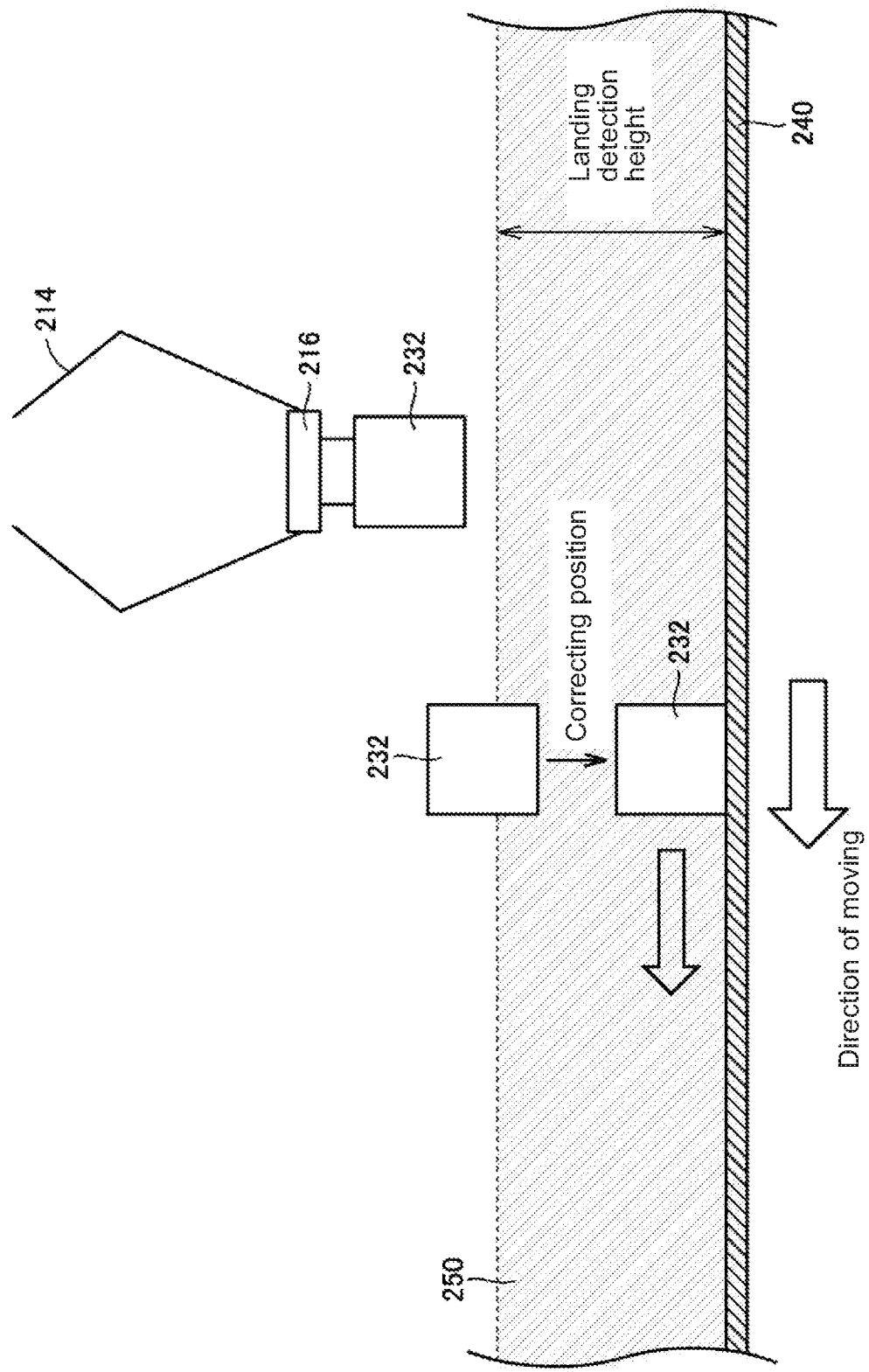

SIMULATOR, SIMULATION METHOD, AND SIMULATION PROGRAM

CROSS-REFERENCES TO RELATED APPLICATIONS

This application claims priority to Japanese Patent Application No. 2015-225784 filed Nov. 18, 2015, the entire contents of which are incorporated herein by reference.

FIELD

The present invention relates to a simulator, a simulation method, and a simulation program for estimating the behavior of a system.

BACKGROUND

In the field of factory automation (FA), various automatic control techniques are used widely. Such automatic control techniques may be used for applications for tracking the positions of targets such as workpieces and processing the workpieces as intended, using various robots.

Designing or examining the system to be controlled with the above automatic control technique may need preliminary evaluation of the performance of the entire system. In response to this, a technique has been developed for virtually creating a system and simulating its operation. For example, Japanese Unexamined Patent Application Publication No. 2013-191128 (Patent Literature 1) describes a technique for integrated simulations of a mechanical system including a visual sensor in a real space corresponding to a virtual imaging unit. With the technique described in Patent Literature 1, a 3D simulator and a visual sensor simulator cooperate with each other to virtually generate captured images of a workpiece in a 3D space at predetermined timings.

Japanese Unexamined Patent Application Publication No. 09-258815 (Patent Literature 2) describes simulations in which one model follows another. The simulations represent the kinetic chain of models that move in accordance with the master-slave relationship defined between the affecting model and the affected model.

CITATION LIST

Patent Literature

Patent Literature 1: Japanese Unexamined Patent Application Publication No. 2013-191128
Patent Literature 2: Japanese Unexamined Patent Application Publication No. 09-258815

SUMMARY

Technical Problem

In some applications, a workpiece may not be placed onto the transporting surface of, for example, a conveyor, but may be released from a position a little away from the transporting surface and then fall freely onto the transporting surface.

Although Patent Literature 2 describes a following operation performed in transporting a workpiece on a conveyor in FIG. 24, it neither describes a method for defining the master-slave relationship between the workpiece and the conveyor nor describes any processing for multiple workpieces placed on the conveyor.

An application involving a target placed near a transporting surface of a carrier instead of being placed directly on the transporting surface may also use simulations reflecting the actual behavior of the target.

Solution to Problem

A simulator according to one aspect of the present invention estimates a behavior of a system including a carrier having a transporting surface for continuously transporting a target that is placed thereon and a processing device for picking up and placing the target onto the transporting surface. The simulator includes a creating unit, a tracking unit, and an instruction generation unit. The creating unit virtually creates the system in a three-dimensional virtual space. The tracking unit updates positions of a plurality of targets placed on the transporting surface in the three-dimensional virtual space based on a corresponding movement of the carrier, and updates a position of a target picked up by the processing device in the three-dimensional virtual space in a manner associated with a behavior of the processing device. The instruction generation unit generates a control instruction for the behavior of the processing device based on the position of each target in the three-dimensional virtual space. When the processing device places a target within a predetermined range from the transporting surface, the tracking unit associates the target with the transporting surface and updates a position of the target.

In some embodiments, when the processing device places a first target within a predetermined range from a surface of a second target determined to have been placed on a part of the transporting surface, the tracking unit associates a position of the first target and a position of the second target with each other and updates the positions of the first target and the second target.

In some embodiments, the tracking unit determines a size of the predetermined range in accordance with a height of a target in the three-dimensional virtual space.

In some embodiments, the simulator further includes an input unit that receives a setting for the size of the predetermined range. In the three-dimensional virtual space, an area indicating the predetermined range is expressed by using a semitransparent object.

In some embodiments, when the processing device places a target within a predetermined range from the transporting surface, the tracking unit updates a position of the target in a height direction in the three-dimensional virtual space to bring the target into contact with the transporting surface.

In some embodiments, when the processing device places a target within a range including the transporting surface and the second target, the tracking unit associates the target with one of the transporting surface and the second target based on predetermined priorities.

In some embodiments, the tracking unit corrects a position of a target in a horizontal direction in the three-dimensional virtual space in accordance with a transporting speed in the horizontal direction in the three-dimensional virtual space at a timing when the processing device releases the target.

In some embodiments, the simulator further includes a measurement unit that performs image measurement of an input image including at least a part of a target as a subject of the image in a manner associated with an area predefined on the transporting surface in the three-dimensional virtual space. In response to detection of a target by the measurement unit, the tracking unit displays the detected target in the three-dimensional virtual space.

A simulation method according to another aspect of the present invention is implemented by a computer for estimating a behavior of a system. The system includes a carrier having a transporting surface for continuously transporting a target that is placed thereon and a processing device for picking up and placing the target onto the transporting surface. The method includes a creating process, an updating process, and an instruction generating process. The creating process includes virtually creating the system in a three-dimensional virtual space. The updating process includes updating positions of a plurality of targets placed on the transporting surface in the three-dimensional virtual space based on a corresponding movement of the carrier, and updating a position of a target picked up by the processing device in the three-dimensional virtual space in a manner associated with a behavior of the processing device. The instruction generating process includes generating a control instruction for the behavior of the processing device based on the position of each target in the three-dimensional virtual space. The updating process includes, when the processing device places a target within a predetermined range from the transporting surface, associating the target with the transporting surface and updating a position of the target.

A simulation program according to another aspect of the present invention is used to estimate a behavior of a system including a carrier having a transporting surface for continuously transporting a target that is placed thereon and a processing device for picking up and placing the target onto the transporting surface. The simulation program causes a computer to implement a creating process, an updating process, and an instruction generating process. The creating process includes virtually creating the system in a three-dimensional virtual space. The updating process includes updating positions of a plurality of targets placed on the transporting surface in the three-dimensional virtual space based on a corresponding movement of the carrier, and updating a position of a target picked up by the processing device in the three-dimensional virtual space in a manner associated with a behavior of the processing device. The instruction generating process includes generating a control instruction for the behavior of the processing device based on the position of each target in the three-dimensional virtual space. The updating process includes, when the processing device places a target within a predetermined range from the transporting surface, associating the target with the transporting surface and updating a position of the target.

Advantageous Effects

Embodiments of the present invention allow simulations reflecting the actual behavior of a target in an application involving a target placed near a transporting surface of a carrier instead of being placed directly on the transporting surface.

BRIEF DESCRIPTION OF THE DRAWINGS

FIG. 4 is a schematic diagram describing a landing detection height used in the simulator according to the embodiment.

FIG. 18 is a schematic diagram describing position corrections in a height direction in the simulator according to the embodiment.

DETAILED DESCRIPTION

Figure 1:
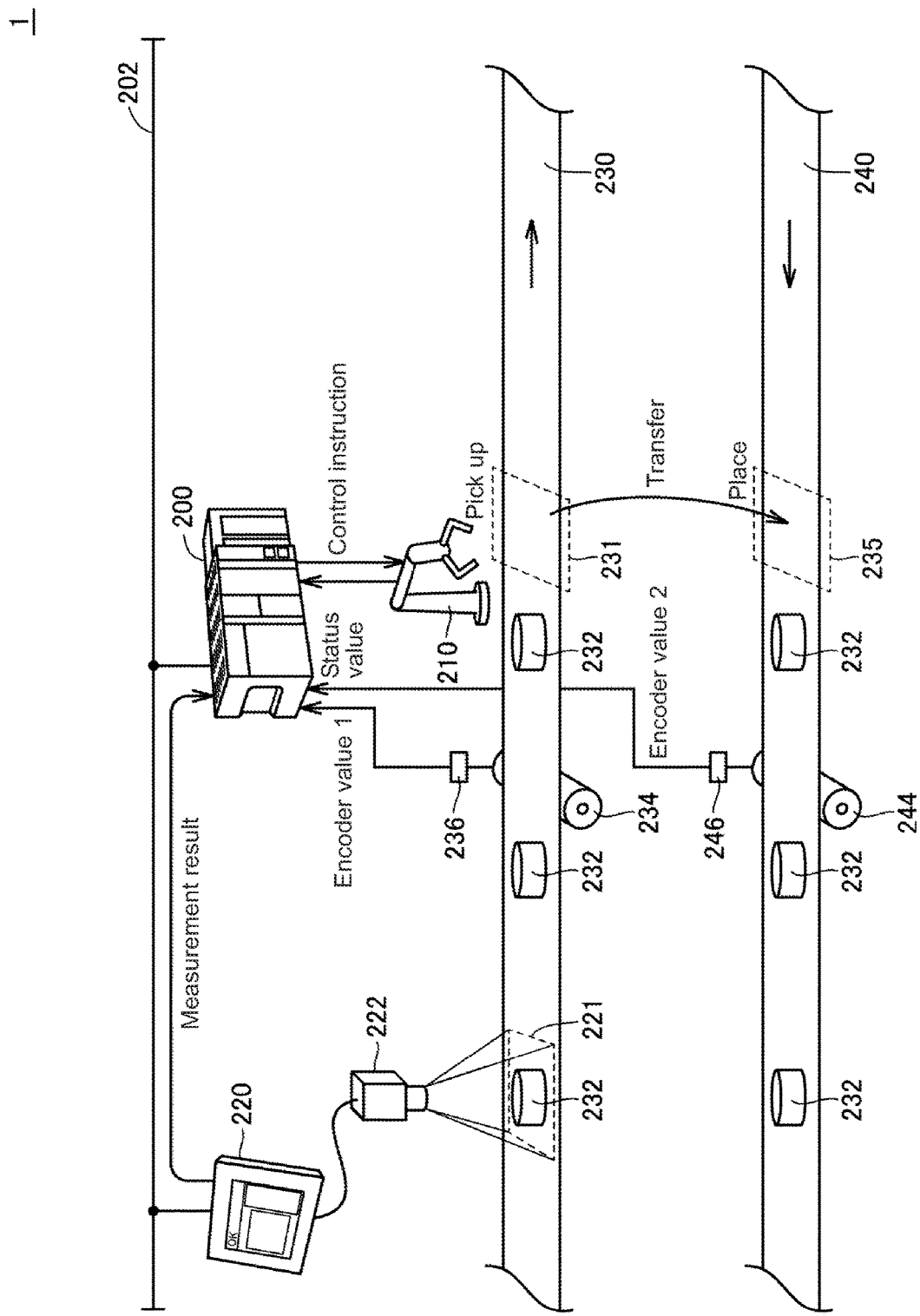
FIG. 1 is a schematic diagram showing the configuration of a system to be simulated by a simulator according to one embodiment.

Embodiments of the present invention will now be described in detail with reference to the drawings. The same or corresponding components in the figures are given the same reference numerals, and will not be described redundantly.

A. Simulation

A simulation for estimating the behavior of a system performed by a simulator according to the present embodiment will now be described.

The simulator according to the present embodiment estimates (or simulates) the behavior of a system including a carrier having a transporting surface for continuously transporting a target placed on the surface, and a processing device for picking up the target and placing the target onto the transporting surface.

In the present embodiment, one or more conveyors function as the carrier having a transporting surface for continuously transporting targets placed on the surface, and one or more robots function as the processing device for processing the targets. The carrier and the processing device are not limited to these examples and may be selected as appropriate depending on the system to be simulated. The targets may hereafter also be referred to as workpieces. A workpiece may be any item that allows position tracking, and may for example be an end product or its part, or an intermediate product or its part.

The simulation performed by the simulator according to the present embodiment will now be described briefly.

FIG. 1 is a schematic diagram showing the configuration of a system to be simulated by the simulator according to the present embodiment. As shown in FIG. 1, for example, a conveyor tracking system 1 includes a robot 210, which picks up a workpiece 232 within a predetermined tracking area 231 when the workpiece 232 transported continuously on a conveyor 230 reaches the tracking area 231, and transfers to and places the workpiece 232 into a tracking area 235 on a conveyor 240. This series of actions performed by the robot 210, or picking, transferring, and placing, may be referred to as the pick-and-place operation. For ease of explanation, a conveyor for transporting workpieces to be picked up is also referred to as a workpiece pickup conveyor, whereas a conveyor on which the workpieces are to be placed is also referred to as a workpiece placement conveyor.

To enable the pick-and-place operation of the robot 210, an imaging unit 222 captures an image of an imaging area 221 defined on a part of the conveyor 230, and a visual sensor 220 performs image measurement including pattern matching of an input image captured by the imaging unit 222 and obtains the measurement results including information about the position, type, orientation, and other parameters of the workpiece 232.

A controller 200 executes a predetermined control logic based on the measurement result obtained by the visual sensor 220 to sequentially update (or track) the position of the workpiece 232 and generate a control instruction for the robot 210. The controller 200 typically includes a programmable logic controller (PLC).

To generate the control instruction for the robot 210, the controller 200 refers to the status value of the robot 210, and an encoder value provided from an encoder 236, which is connected to a drive roller 234 for driving the conveyor 230 (encoder value 1), and an encoder value from an encoder 246 coupled to a drive roller 244 for driving the conveyor 240 (encoder value 2). The controller 200 and the visual sensor 220 are connected to each other with a network 202 to allow data communication between them. The measurement results are transmitted from the visual sensor 220 to the controller 200 through the network 202.

Evaluating the processing capability (e.g., a tact time) and the accuracy of processing may be intended before the conveyor tracking system 1 shown in FIG. 1 is installed. This is because actually installing the conveyor tracking system 1 and checking the processing capability is often difficult due to the cost or time constraints. The simulator according to the present embodiment is designed to achieve simpler estimation of the behavior of the conveyor tracking system 1. Thus, the simulator according to the present embodiment virtually creates a system to be simulated in a three-dimensional virtual space to achieve more efficient simulation.

Figure 2:
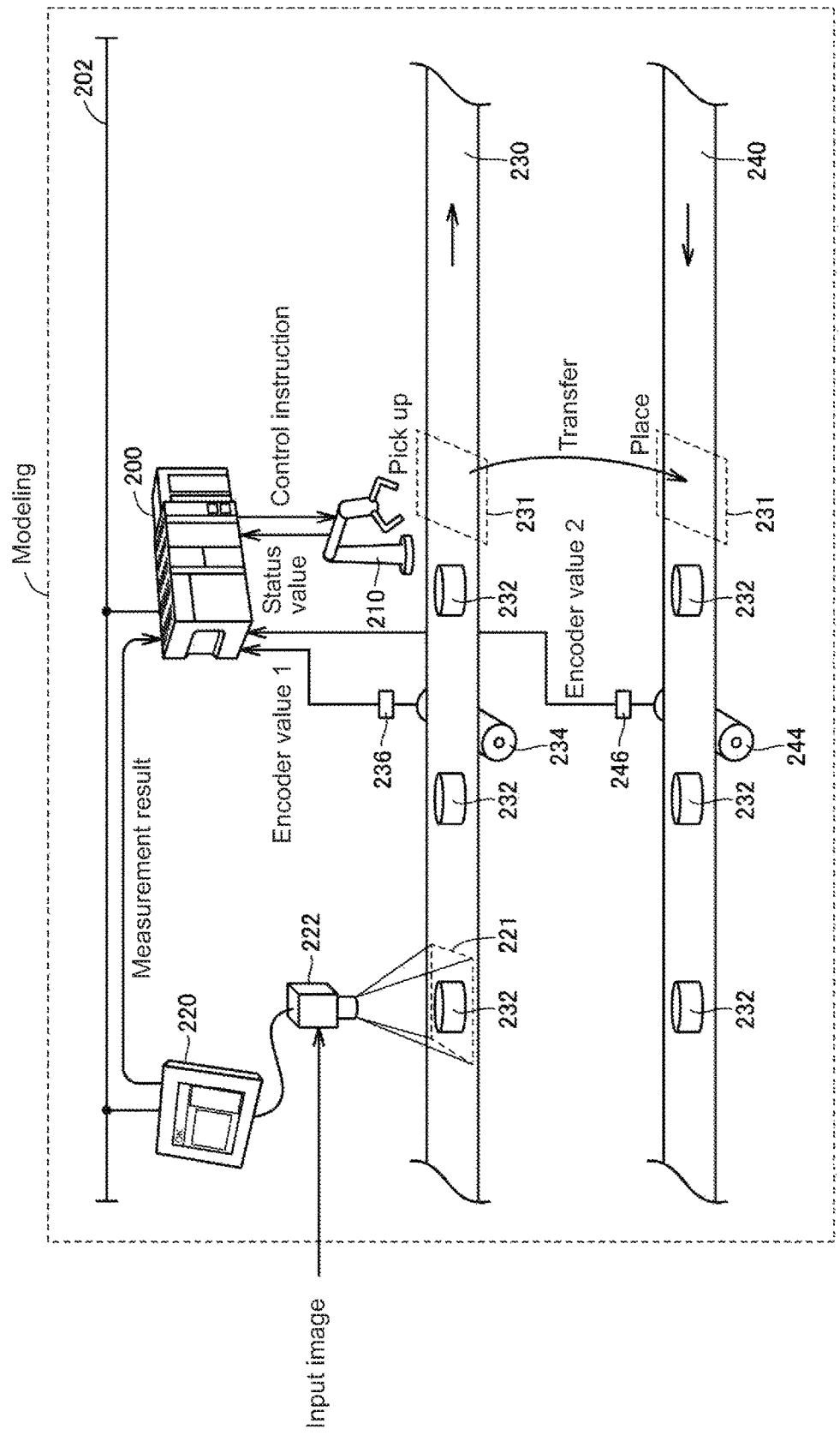
FIG. 2 is a schematic diagram describing a simulation method implemented by the simulator according to the embodiment.

FIG. 2 is a schematic diagram describing a simulation method implemented by the simulator according to the present embodiment. With reference to FIG. 2, the simulator models the entire conveyor tracking system 2, which is to be simulated, and incorporates an input image into this system model to simulate an image-capturing operation performed by the imaging unit 222.

The input image incorporated into the system model of the conveyor tracking system 2 can represent specifications expected in the design (e.g., the moving speed of a workpiece 232 or the number of workpieces 232 passing per unit time). Typically, the input image may be an image actually captured on a similar production line.

Although the input image used in the simulation is expected to be an image captured in the existing system (e.g., the system before update when an updated system is to be simulated), the input image may be captured in any system and situation. More specifically, the input image may be any image including chronological change information about a target to be simulated (typically, a workpiece 232).

The input image may be moving image data or data representing a plurality of still images arranged chronologically. The reproduction speed of the moving image data or the update frequency of the data representing the still images can be adjusted as appropriate to adjust the chronological changes (or the moving speed) of a target to be controlled. Adjusting the input image incorporated in the system model in this manner allows the simulation to yield an optimal value for the chronological changes of the control target.

Additionally, still images that are not actually captured sequentially but are captured in different situations may be arranged as chronologically changing images and used as an input moving image. Although the images generated in this case have no workpiece overlapping, this causes substantially no problem in performing the simulation.

B. Overview

The processing for simulation performed by the simulator according to the present embodiment will now be described briefly.

In applications involving the pick-and-place operation, a workpiece may be released above the transporting surface of the conveyor, instead of being released after placed onto the transporting surface. In other words, a robot may release a workpiece at a position above the transporting surface of the conveyor. This intends to prevent the workpiece from being damaged when contacting the conveyor.

Figure 3A:
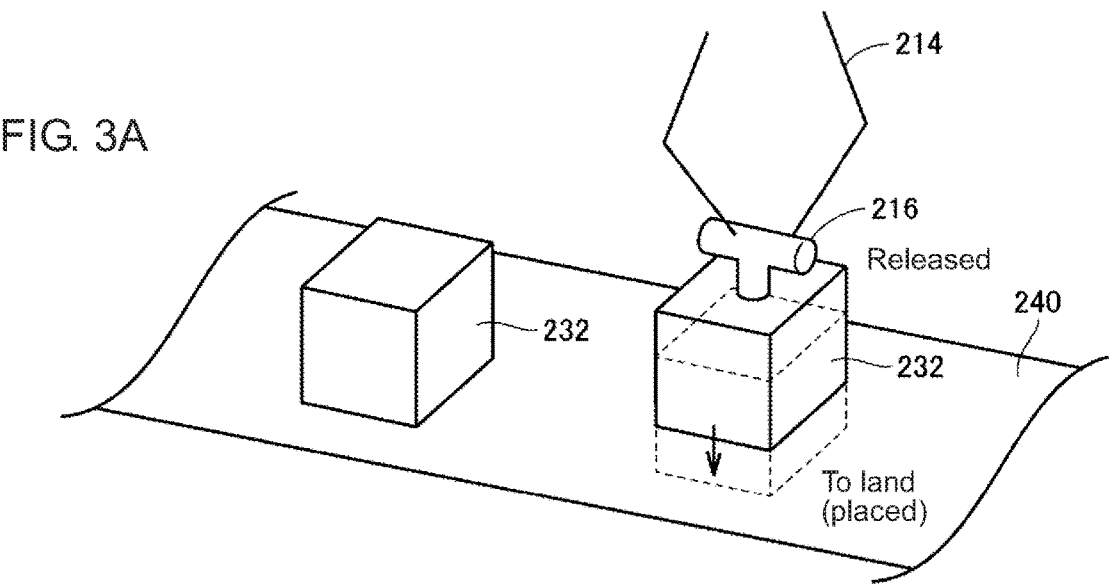
FIGS. 3A and 3B are schematic diagrams describing examples of applications used by the simulator according to the embodiment.
Figure 3B:
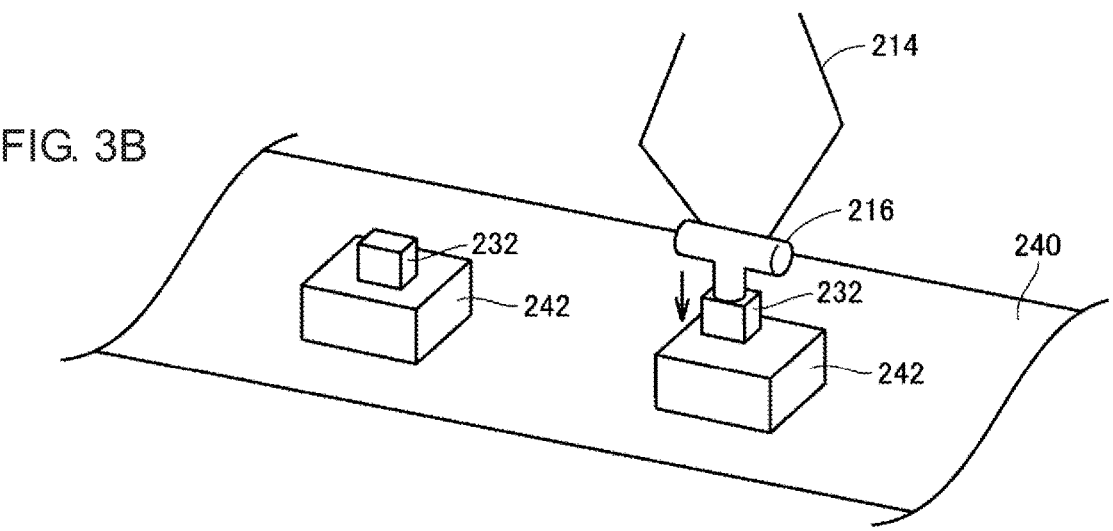

FIGS. 3A and 3B are schematic diagrams describing examples of applications used by the simulator according to the present embodiment. With reference to FIG. 3A, a robotic arm 214 has a robot tool 216 on its end to attract a workpiece. The robot tool 216 is, for example, an air suction device, and produces a negative pressure to hold a workpiece. For example, the robot picks up a workpiece on the workpiece pickup conveyor (not shown), and operates its robot tool 216 to release the workpiece at a position above the transporting surface of the workpiece placement conveyor 240. The workpiece then falls under gravity and lands on the transporting surface of the conveyor 240, and is transported subsequently.

One application may involve multiple processes in which different workpieces are placed. For this application, one workpiece is released above another workpiece that has already been placed.

An application for placing a workpiece 232 onto a workpiece 242 that has already been placed will be described with reference to FIG. 3B. In this case as well, the workpiece 232 is released at a position above the workpiece 242. The application shown in FIG. 3B may also be used for placing multiple workpieces sequentially into a single container.

With simulation techniques known in the art, the workpiece released in the application shown in FIG. 3B is not determined to be placed on the conveyor, because the workpiece is not on the transporting surface of the conveyor at the timing when the workpiece is released (or in other words when the workpiece is placed). The simulation cannot calculate the influence of gravity acting on the workpiece, and thus cannot be accurate for the application shown in FIG. 3B.

To overcome this, the simulator according to the present embodiment can simulate the behavior nearer the reality for an application in which a workpiece is placed above the transporting surface of the carrier.

FIG. 4 is a schematic diagram describing a landing detection height used in the simulator according to the present embodiment. With reference to FIG. 4, a predetermined range from the transporting surface of the conveyor 240 is defined as a landing detection height. When the robot tool 216 arranged at the end of the robotic arm 214 releases the workpiece 232 with its part being within the range of the landing detection height, the workpiece 232 is determined to have landed on the conveyor 240. The workpiece 232 is then moved in synchronization with the conveyor 240. The workpiece 232 attracted to the robot tool 216 shown in FIG. 4 is immediately before being released by the robot tool 216.

In this manner, the simulator according to the present embodiment may set the landing detection height used for the workpiece placement conveyor 240. When the system model, which is a simulation target, is displayed in a three-dimensional virtual space, an object 250 indicating the area defined by the landing detection height may also appear. The object 250 may be semitransparent (or have a color with predetermined transmittance) so that it does not block view of the workpiece 232 in the three-dimensional virtual space. More specifically, a semitransparent object may represent the area defined by the landing detection height in the three-dimensional virtual space.

As shown in FIG. 4, when the pick-and-place operation causes the released workpiece 232 to enter the area indicated by the object 250, the workpiece 232 moves in synchronization with the advancing conveyor 240, although the workpiece 232 is not in contact with the conveyor 240.

Figure 5:
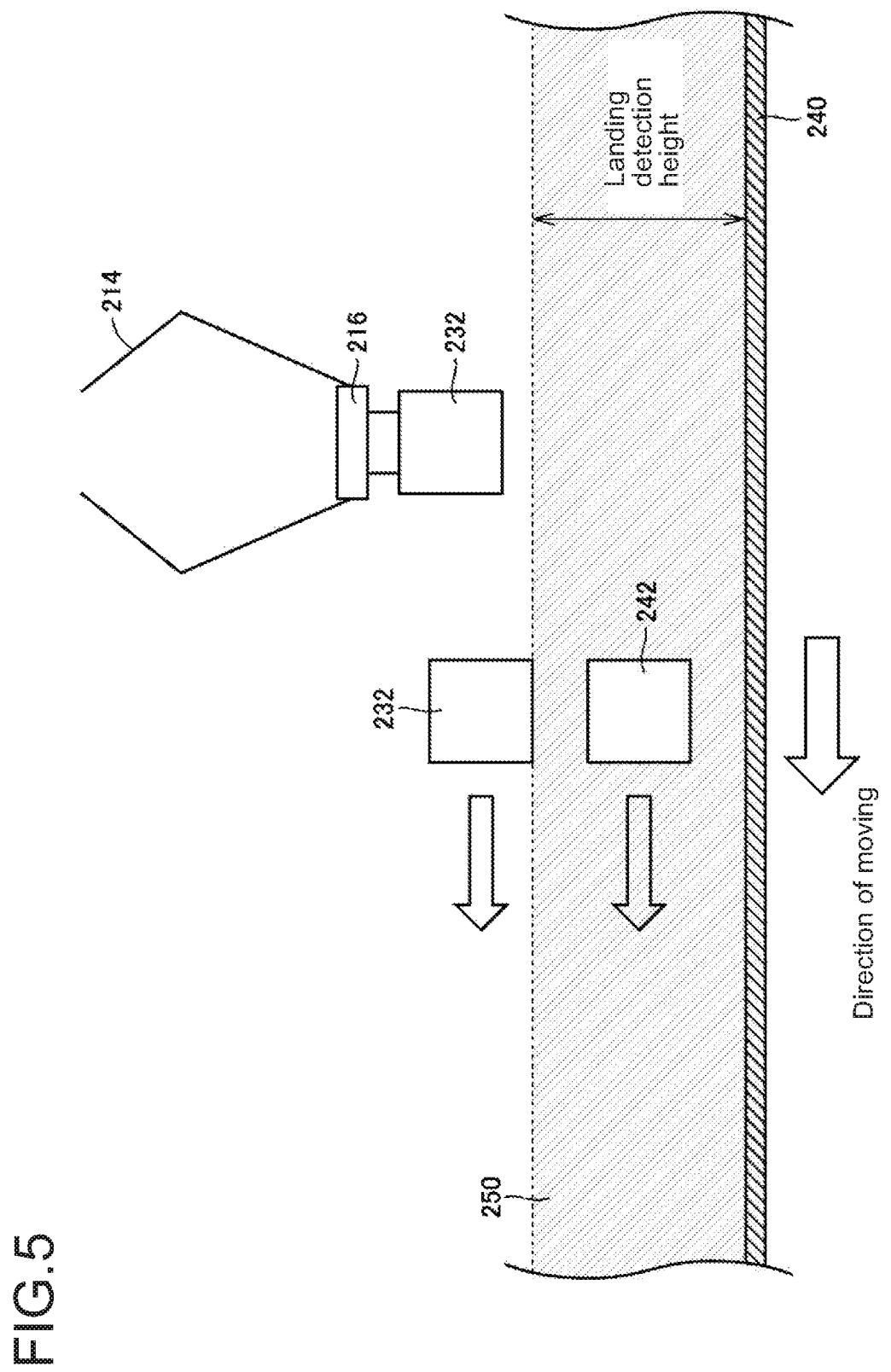
FIG. 5 is another schematic diagram describing the landing detection height used in the simulator according to the embodiment.

FIG. 5 is another schematic diagram describing the landing detection height used in the simulator according to the present embodiment. As shown in FIG. 5, when multiple workpieces 242 and 232 are at least partially within the area defined by the landing detection height, the workpieces 242 and 232 and the object may also move in synchronization with the advancing conveyor 240. The workpiece 232 attracted to the robot tool 216 shown in FIG. 5 is immediately before being released by the robot tool 216.

As described above, when the robot places a workpiece within a predetermined range from the transporting surface, the simulator 100 updates the position of the workpiece in a manner associated with the transporting surface. This enables the simulation, without reflecting the gravity acting on the workpiece, to be substantially the same as the simulation reflecting the gravity actually acting on the workpiece when the workpiece is released at a position away from the transporting surface of the carrier.

C. Hardware Configuration of Simulator

The hardware configuration of the simulator 100 according to the present embodiment will now be described. The simulator 100 according to the embodiment is implemented typically by one or more computers executing a program.

Figure 6:
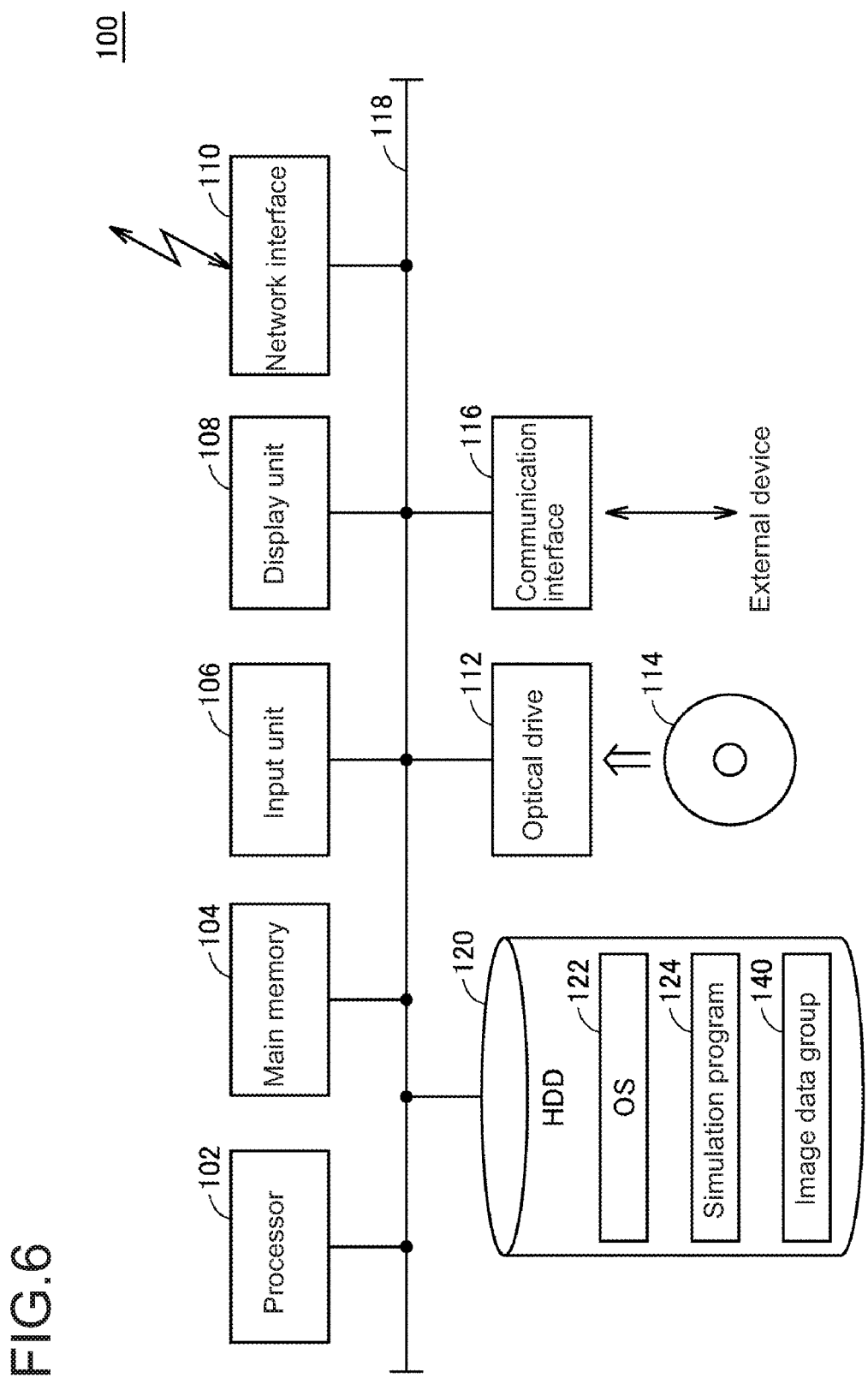
FIG. 6 is a schematic diagram showing the hardware configuration of the simulator according to the embodiment.

FIG. 6 is a schematic diagram showing the hardware configuration of the simulator 100 according to the present embodiment. With reference to FIG. 6, the simulator 100 is, for example, a computer having the general-purpose computer architecture. The simulator 100 includes a processor 102, a main memory 104, an input unit 106, a display unit 108, a network interface 110, a hard disk drive (HDD) 120, an optical drive 112, and a communication interface 116. These components are connected to each other with an internal bus 118 in a communicable manner.

The processor 102 loads a program stored in the hard disk drive 120 into the main memory 104 and executes the program to implement the functions and the processing described later. The main memory 104 is a volatile memory and functions as a working memory used for program execution by the processor 102.

The input unit 106 typically includes a keyboard, a mouse, a touch panel, and a touchpad, and receives a user operation. The display unit 108 includes a display and an indicator, and presents various pieces of information to a user.

The network interface 110 exchanges data with external devices such as a server through a network. The optical drive 112 reads various programs from an optical disc 114 or other media, and installs the programs into the hard disk drive 120. The communication interface 116 is, for example, a universal serial bus (USB) communication interface, and exchanges data with external devices such as an auxiliary storage through local communications.

The hard disk drive 120 stores an operating system (OS) 122, a program for providing the functions of the simulator 100, such as a simulation program 124, and an image data group 140 including preliminarily obtained input images used for simulation.

Although an intended program is installed in the simulator 100 via the optical drive 112 in the configuration example shown in FIG. 6, a program may be downloaded from a server or other devices on the network.

When the simulator is a general-purpose computer as described above, an OS may be installed on the computer to provide the basic function of the computer, in addition to a program for providing the functions according to the present embodiment. In this case, the simulation program according to the present embodiment may call program modules included in the OS in a predetermined order and/or at predetermined timings as appropriate to perform processing. More specifically, the program according to the present embodiment may not include these program modules and may cooperate with the OS to perform processing. The program according to the present embodiment may not include such modules.

The program according to the present embodiment may be incorporated as a part of another program to be combined. The program according to the present embodiment may not thus include modules of the program to be combined, and may cooperate with the program to achieve processing. In other words, the simulation program according to the present embodiment may be incorporated in the other program.

Although FIG. 6 shows the simulator 100 that is a general-purpose computer, the simulator 100 may be partly or entirely implemented using a dedicated circuit (e.g., an application specific integrated circuit, or ASIC). Additionally, an external device may perform a part of the processing of the simulator 100.

Although the simulator 100 according to the present embodiment shown in FIG. 6 is a single device, two or more devices cooperating with each other may function as the simulator 100. The simulator 100 according to the present embodiment may include a system combining two or more separate devices.

D. Functional Structure of Simulator

The functional structure of the simulator 100 according to the present embodiment will now be described.

Figure 7:
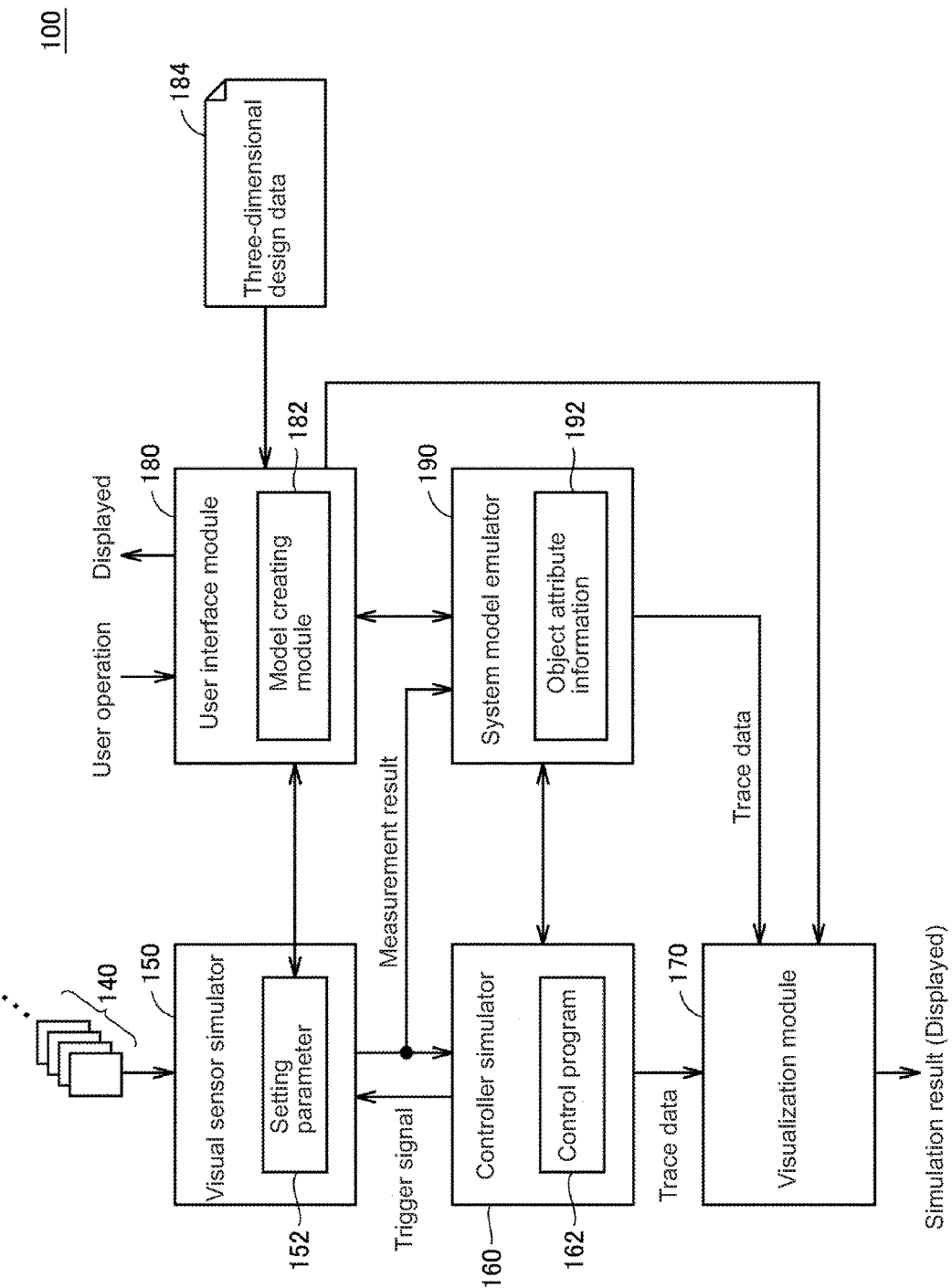
FIG. 7 is a schematic diagram showing the functional structure of the simulator according to the embodiment.

FIG. 7 is a schematic diagram showing the functional structure of the simulator 100 according to the present embodiment. The simulator 100 shown in FIG. 7 includes a visual sensor simulator 150, a controller simulator 160, a visualization module 170, a user interface module 180, and a system model emulator 190 as software functions. This group of functional modules is typically implemented by the processor 102 (refer to FIG. 6) executing the simulation program 124.

The user interface module 180 provides an operation screen for aiding the user to set and create a setting parameter 152, a control program 162, and three-dimensional design data 184. The user interface module 180 also provides any user interface used when the visualization module 170 displays simulation results.

The user interface module 180 includes a model creating module 182 for handling the three-dimensional design data 184. The model creating module 182 virtually creates the system to be simulated in a three-dimensional virtual space. More specifically, the model creating module 182 displays a three-dimensional virtual space, and provides a setting and operation screen for creating the system to be simulated in the three-dimensional virtual space.

The simulator 100 according to the present embodiment typically virtually creates, in a three-dimensional virtual space, a system including a carrier (typically, a conveyor) having a transporting surface for continuously transporting a workpiece placed on the surface and a processing device for picking up the workpiece and placing the workpiece onto the transporting surface. Further, as shown in FIG. 2, the system model further includes an imaging area 221 defined for the visual sensor 220. The system model intended for the pick-and-place operation as shown in FIG. 2 may further define an area in which a workpiece is to be picked up (tracking area 231) and an area in which the workpiece is to be placed (tracking area 235).

The visual sensor simulator 150 is a module for simulating the processing performed by the visual sensor 220, and performs image measurement of an input image including at least a part of a workpiece as a subject of the image in a manner associated with the imaging area 221 predefined on the transporting route (conveyor) in the three-dimensional virtual space. More specifically, in response to a fetch instruction (typically, a trigger signal) from the controller simulator 160, the visual sensor simulator 150 retrieves the corresponding image data from the preliminarily obtained image data group 140, and performs the image measurement in accordance with a predetermined setting parameter 152.

The measurement results from the image measurement performed by the visual sensor simulator 150 are output to the controller simulator 160. The output processing corresponds to the transmission of the measurement results obtained by the visual sensor 220 to the controller 200 through the network 202 in the conveyor tracking system shown in FIG. 1.

The controller simulator 160 performs a control operation for generating a control instruction for the behavior of a robot, which is an example of the processing device, based on the measurement results from the visual sensor simulator 150 and the position of each workpiece in the three-dimensional virtual space. The controller simulator 160 is a module for simulating the processing in the controller 200 (refer to FIG. 1), and performs a control operation (a sequence instruction, a motion instruction, or various functional instructions) in accordance with the preliminarily created control program 162.

The control operation performed in the controller simulator 160 includes processing for generating a fetch instruction (trigger signal) for retrieving image data, which is to be transmitted to the visual sensor simulator 150. More specifically, when a predetermined condition is satisfied, the controller simulator 160 generates a trigger signal. The predetermined condition is, for example, that the conveyor has moved by a predetermined distance, or a predetermined period has ended.

The system model emulator 190 sequentially updates the attributes of each object in the system model (e.g., the position, orientation, and speed at each timing) as the simulation proceeds. More specifically, the system model emulator 190 creates and updates object attribute information 192 in a manner associated with each object included in the system model created by the model creating module 182.

The system model emulator 190 sets the positions and other attributes of components included in the created system model as initial values. The system model emulator 190 updates the attribute values of each object included in the object attribute information 192 as the simulation proceeds in accordance with a control instruction generated by the controller simulator 160. More specifically, the system model emulator 190 is responsible for tracking, which updates the positions of multiple workpieces placed on the transporting surface of the conveyor in the three-dimensional virtual space based on a corresponding movement of the conveyor and also updates the position of a workpiece held by the robot in the three-dimensional virtual space in a manner associated with the behavior of the robot.

The system model emulator 190 also outputs information indicating the position or displacement of the conveyor to the controller simulator 160 in a manner associated with the movement of the conveyor. In one example, the system model emulator 190 may output the encoder value indicating a displacement from a reference position, or may generate pulses proportional to a movement of the conveyor per unit time. In this case, the encoder value indicates the position of the conveyor, and the number of pulses per unit time indicates the speed of the conveyor.

The controller simulator 160 outputs the time-series data for the control instruction directed to the robot, and the trace data including the measurement results from the visual sensor simulator 150. The system model emulator 190 outputs the trace data including the chronological changes of each object in the system model.

The visualization module 170 uses the trace data to visualize the results of the simulation performed for the system model. More specifically, the visualization module 170 uses the three-dimensional design data 184, which is a definition file, to visualize the system virtually created in the three-dimensional virtual space, and also uses the trace data provided from the controller simulator 160 to reproduce the chronological changes of the workpiece and the robot in the system. The simulation results may be visualized by the visualization module 170 after a series of simulations is complete, or the simulation results may be displayed as they are yielded during simulation.

In this manner, the visualization module 170 represents the chronological changes of the simulation results in the form of animation or a moving image on the display unit 108 of the simulator 100 (FIG. 6).

In the functional structure shown in FIG. 7, the controller simulator 160 outputs the time-series data for its output control instruction to the robot and also the trace data including the measurement results from the visual sensor simulator 150. However, the functional structure is not limited to this example. The visualization module 170 may combine the time-series data with the trace data to reproduce the system behavior.

Although FIG. 7 shows the example in which the visualization module 170 reproduces the behavior of the created system using the trace data output from the controller simulator 160, the simulator 100 may not include the visualization module 170. For example, the trace data from the controller simulator 160 may be output to an external device or an external application, and the external device or the external application may reproduce the behavior of the system. In some embodiments, the visualization module 170 may simply generate and store moving image data for reproducing the behavior of the system in any storage medium, which may then be reproduced by another application.

E. Procedure

The procedure of simulation performed by the simulator 100 according to the present embodiment will now be described.

Figure 8:
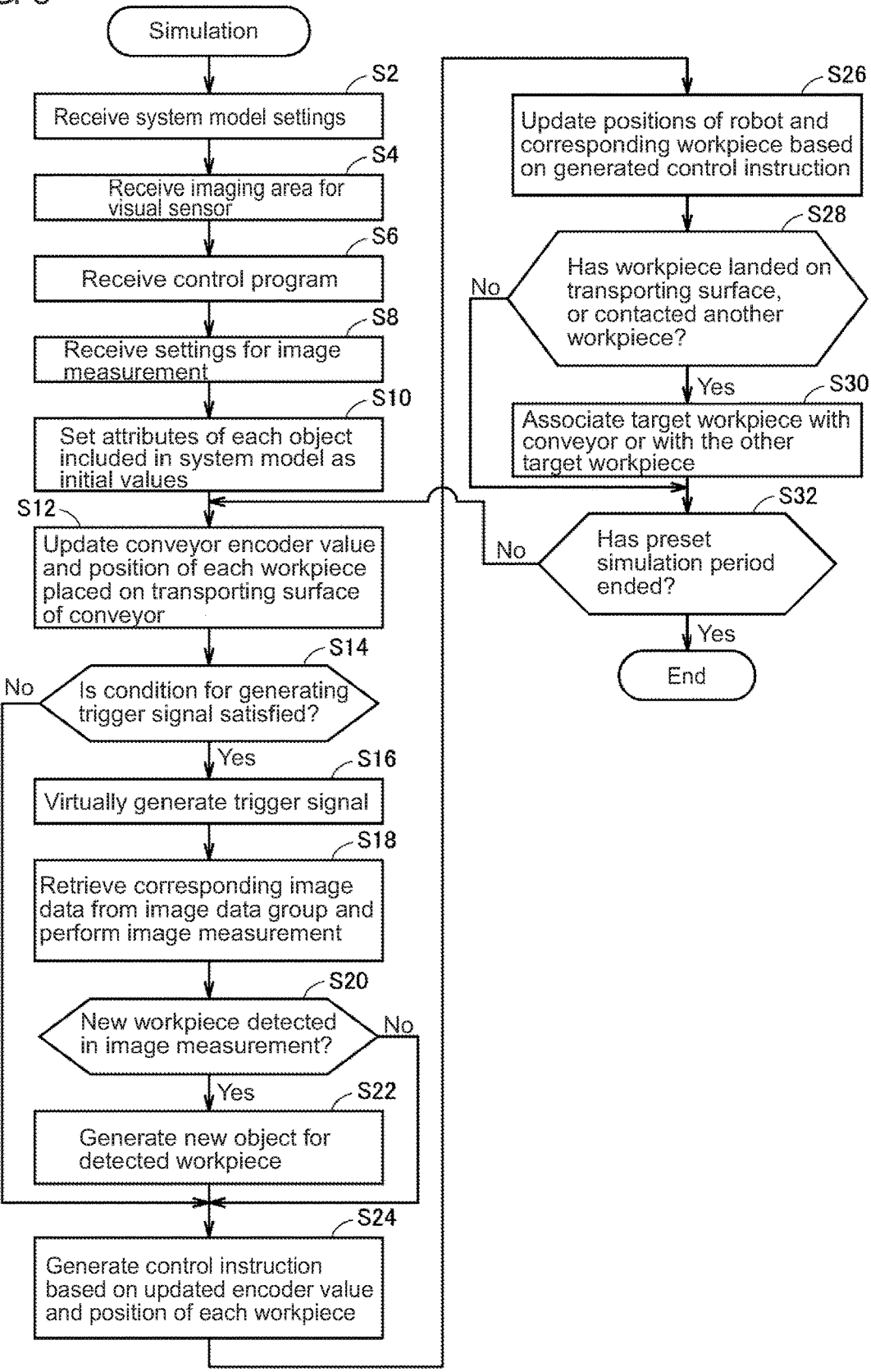
FIG. 8 is a flowchart showing the procedure of simulation performed by the simulator according to the embodiment.

FIG. 8 is a flowchart showing the procedure of simulation performed by the simulator 100 according to the present embodiment. With reference to FIG. 8, the simulator 100 first receives the settings of the system model (step S2). The settings of the system model include the arrangement of the devices included in the system, and the moving speed of the conveyor, which is a carrier. Based on these system model settings, the simulator 100 (model creating module 182) virtually creates a system to be simulated (system model) in a three-dimensional virtual space.

The simulator 100 (user interface module 180) receives an imaging area for a visual sensor defined in the system model (step S4). Based on the relative positional relationship between the created system and the defined imaging area, the simulator calculates a calibration parameter, which is a conversion parameter for transforming the measurement results into an input value for a control operation.

The simulator 100 (user interface module 180) then receives a control program for controlling the system model (step S6). The control program is associated with the system, and is to be executed by the controller simulator 160.

The simulator 100 (user interface module 180) receives the settings for image measurement to be performed by the visual sensor simulator 150 (step S8). The settings include designation of the processing details of the image measurement and reference information (e.g., a model image, and a feature quantity calculated from the model image) associated with the designated processing details.

This procedure completes the settings for the simulation.

When instructed to start the simulation, the simulator 100 (system model emulator 190) sets the attributes of each object included in the system model as initial values (step S10). More specifically, the simulator 100 (system model emulator 190) sets the initial values for the position of each workpiece included in the system model, the encoder value indicating the position or movement of the conveyor or the position of the robot.

The simulator 100 (system model emulator 190) then updates the encoder value of the conveyor to the predetermined value corresponding to the end of the first cycle of simulation, and also updates the position of each workpiece placed on the transporting surface of the conveyor (step S12). Workpieces associated with each other (described later) are updated equivalently.

The simulator 100 (controller simulator 160) then determines whether a condition for generating a trigger signal is satisfied based on the updated encoder value and the position of each workpiece (step S14).

When the condition is satisfied (Yes in step S14), the simulator virtually generates a trigger signal (step S16). In response to the generated trigger signal, the simulator 100 (visual sensor simulator 150) retrieves the corresponding image data from the preliminarily obtained image data group, and performs the image measurement (step S18).

The simulator 100 (system model emulator 190) determines whether a new workpiece has been detected through the image measurement (step S20). When a new workpiece has been detected through the image measurement (Yes in step S20), the simulator 100 (system model emulator 190) generates a new object for the detected workpiece (step S22). In other words, the simulator 100 (system model emulator 190) displays the detected workpiece in the three-dimensional virtual space in response to the workpiece detection by the visual sensor simulator 150. The position of the generated new object is calculated based on the position of the imaging area and the local coordinates included in the measurement results.

When no new workpiece has been detected through the image measurement (No in step S20), the processing in step S22 is skipped.

When the condition for generating a trigger signal is not satisfied (No in step S14), the processing in steps S16 to S22 is skipped.

Subsequently, the simulator 100 (controller simulator 160) performs a control operation in accordance with the control program 162 based on the updated encoder value and the position of each workpiece to generate a control instruction (step S24). The simulator 100 (system model emulator 190) updates the positions of the robot and the corresponding workpiece based on the generated control instruction (step S26). For example, when the robot picks up or transfers any workpiece, the position of the target workpiece is updated in accordance with the behavior of the robot. When the robot places the workpiece (or for example releases the workpiece), the position and the status of the target workpiece are updated.

The simulator 100 (system model emulator 190) then determines whether the workpiece has landed on the transporting surface of the conveyor or has contacted another workpiece based on the updated position of the workpiece (step S28). When the simulator determines that the workpiece has landed on the transporting surface of the conveyor or has contacted another workpiece (Yes in step S28), the simulator 100 (system model emulator 190) associates the target workpiece with the conveyor, or associates the target workpiece with the other workpiece (step S30).

The simulator 100 determines whether a preset simulation period has ended (step S32). When the simulation period has not ended (No in step S32), the processing in step S12 and subsequent steps is repeated.

When the preset simulation period has ended (Yes in step S32), the simulation completes.

After the completion of the simulation, the simulator may use the trace data resulting from the simulation to visualize the behavior of the system.

F. Detecting Workpiece Landing on Transporting Surface

The processing for determining whether a workpiece has landed on the transporting surface of the conveyor (processing in the first half of step S28 in FIG. 8) will now be described in detail.

Figure 9:
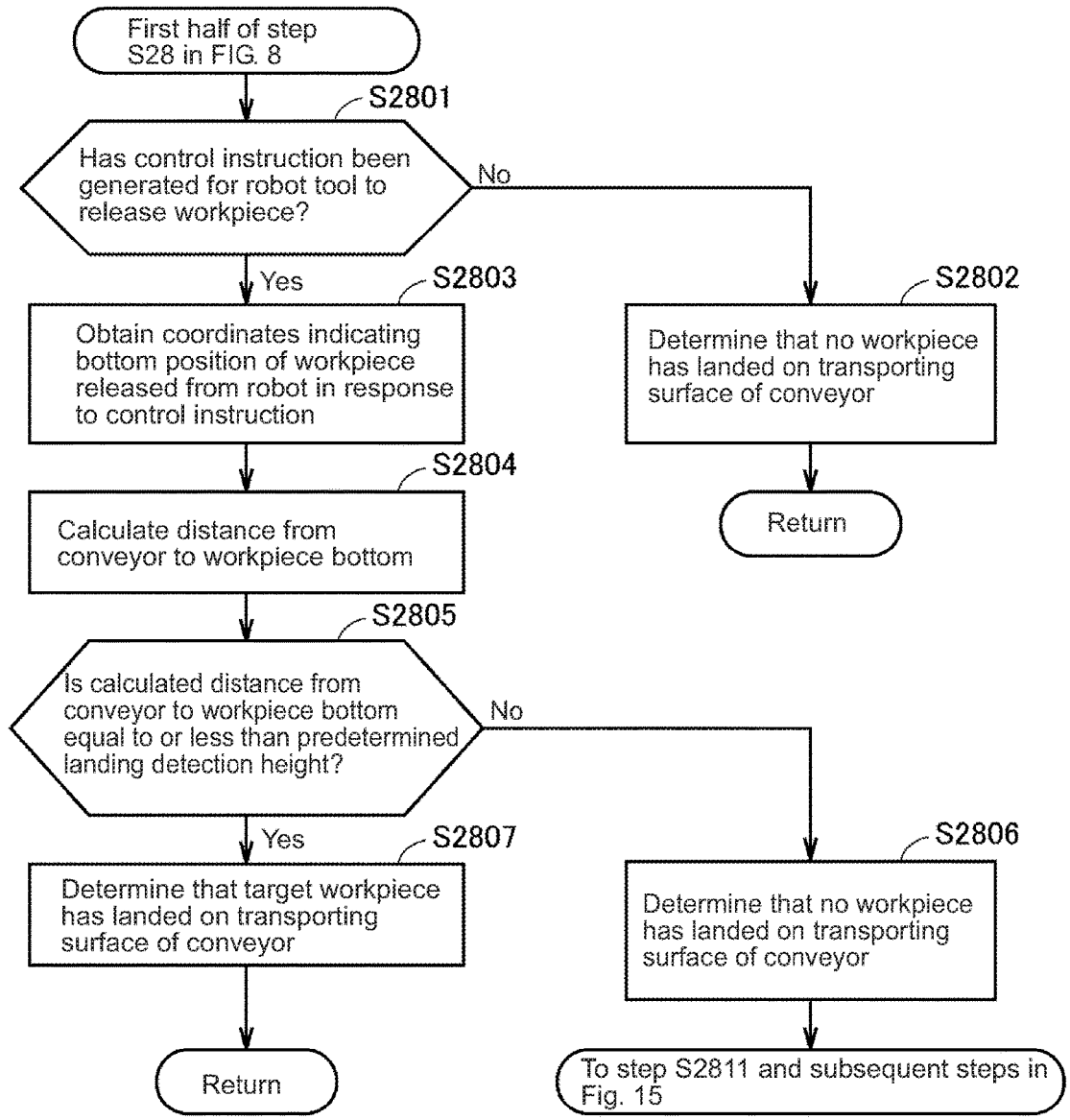
FIG. 9 is a flowchart showing the detailed procedure for the first half part of step S28 in FIG. 8.

FIG. 9 is a flowchart showing the detailed procedure for the first half part of step S28 in FIG. 8. With reference to FIG. 9, the simulator 100 (controller simulator 160) determines whether a control instruction has been generated for the robot tool to release a workpiece (step S2801). When the control instruction has not been generated (No in step S2801), the simulator 100 determines that no workpiece, following the robot tool and released, has landed on the transporting surface of the conveyor (step S2802). The processing then returns to step S28 and subsequent steps in FIG. 8.

When a control instruction has been generated for the robot tool to release a workpiece (Yes in step S2801), the simulator 100 obtains the coordinates indicating the bottom position of the workpiece released from the robot tool in response to the control instruction (step S2803), and calculates the distance from the conveyor to the bottom of the workpiece (e.g., the distance d in FIG. 4) (step S2804).

The simulator 100 determines whether the calculated distance from the conveyor to the bottom of the workpiece is equal to or less than a predetermined landing detection height (step S2805). When the calculated distance is greater than the predetermined landing detection height (No in step S2805), the simulator 100 determines that no workpiece, following the robot tool and released, has landed on the transporting surface of the conveyor (step S2806). The processing advances to step S2811 and subsequent steps shown in FIG. 15, which will be described later.

When the calculated distance is equal to or less than the predetermined landing detection height (Yes in step S2805), the simulator 100 determines that the target workpiece has landed on the transporting surface of the conveyor (step S2807). The processing then returns to step S28 and subsequent steps in FIG. 8.

Figure 10:
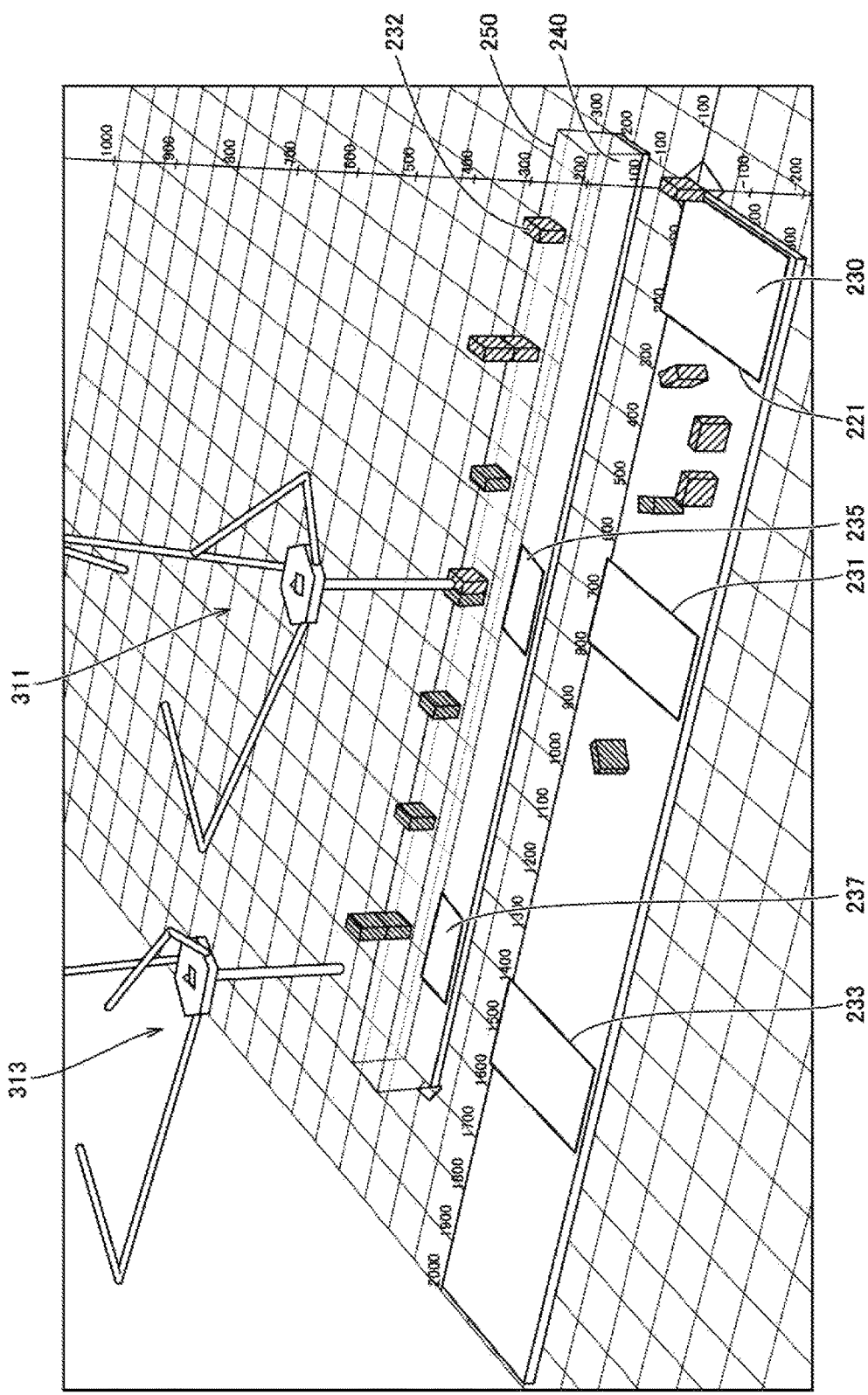
FIG. 10 is a diagram showing one visualized system model created in a three-dimensional virtual space by the simulator according to the embodiment.

FIG. 10 is a diagram showing one visualized system model created in a three-dimensional virtual space by the simulator 100 according to the present embodiment. The simulator 100 according to the present embodiment can render a model within a three-dimensional virtual space in any direction. More specifically, a user can freely change the angle from which the visualized system model is viewed.

With reference to FIG. 10, the conveyor 230 transporting a workpiece to be picked up and the conveyor 240 transporting a workpiece placed on it are arranged in parallel. The conveyors 230 and 240 are associated with two robots 311 and 313. In this system model, a workpiece 232 is transported by the conveyor 230 from left to right in the drawing. When the workpiece 232 reaches the predetermined tracking area 231 or 233, the robot 311 or the robot 313 picks up the incoming workpiece 232 and places the workpiece onto the conveyor 240. The robots 311 and 313 each place the workpiece 232 in the corresponding tracking area 235 or 237 defined on the conveyor 240. Each workpiece 232 placed in a random orientation on the conveyor 230 is aligned in a predetermined direction when placed onto the conveyor 240.

In one example application, the conveyor 230 may transport at least two types of workpieces 232. The robot 311 is controlled to pick up and place one specific type of workpiece, whereas the robot 313 is controlled to pick up and place another type of workpiece. The different types of workpieces may have different shapes. In this case, a robot having a special robot tool dedicated to a particular type of workpiece may be used for that type of workpiece.

In the three-dimensional virtual space, the object 250 is superimposed on the conveyor 240. The object 250 is semitransparent (or has a color with predetermined transmittance) and indicates an area defined by the landing detection height. The object 250 may be hidden from view by a setting operation performed by the user. When the object 250 appears, the user can readily check the range of the landing detection height in the system model.

The landing detection height may be set freely in accordance with the system (application) to be simulated. In this case, the simulator 100 may include an input unit for receiving the setting of the landing detection height (the size of the predetermined range within which workpiece landing is to be detected).

Figure 11A:
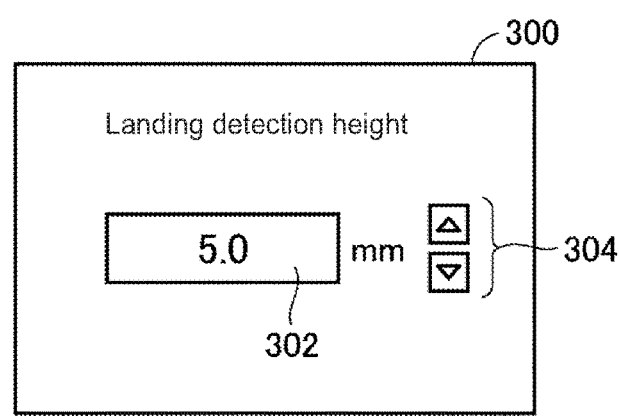
FIGS. 11A and 11B are schematic diagrams showing example user interface screens for setting a landing detection height used in the simulator according to the embodiment.
Figure 11B:
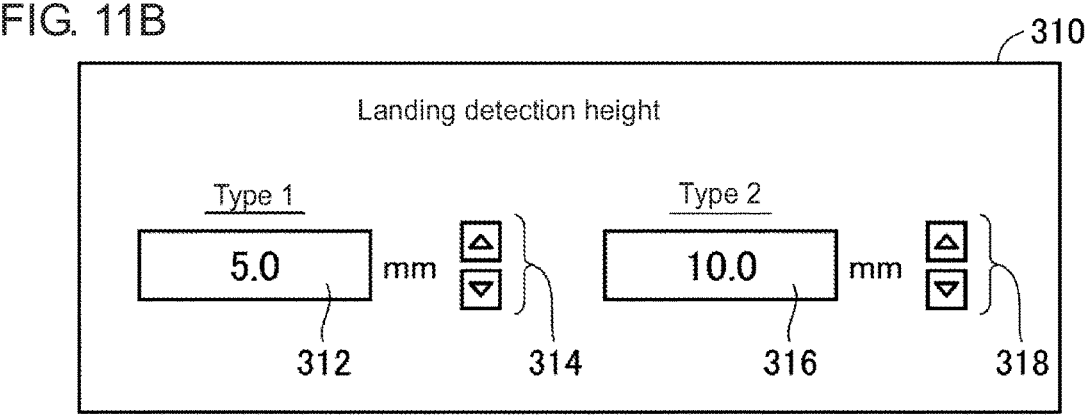

FIGS. 11A and 11B are schematic diagrams showing example user interface screens for setting the landing detection height in the simulator 100 according to the present embodiment. With reference to FIG. 11A, a setting entry screen 300 has an entry field 302, into which the landing detection height is to be entered. The user can enter an intended value directly or by operating a button 304.

Further, landing detection heights may be set separately for different types (e.g., different items or different shapes) of workpieces. A setting entry screen 310 shown in FIG. 11B has an entry field 312 for a workpiece of Type 1, and an entry field 316 for a workpiece of Type 2. The user can enter an intended landing detection height in the entry field 312 directly or by operating a button 314, and for the entry field 316 directly or by operating a button 318.

When the landing detection height is set to zero, some margin may be set to compensate for detection errors.

Figure 12:
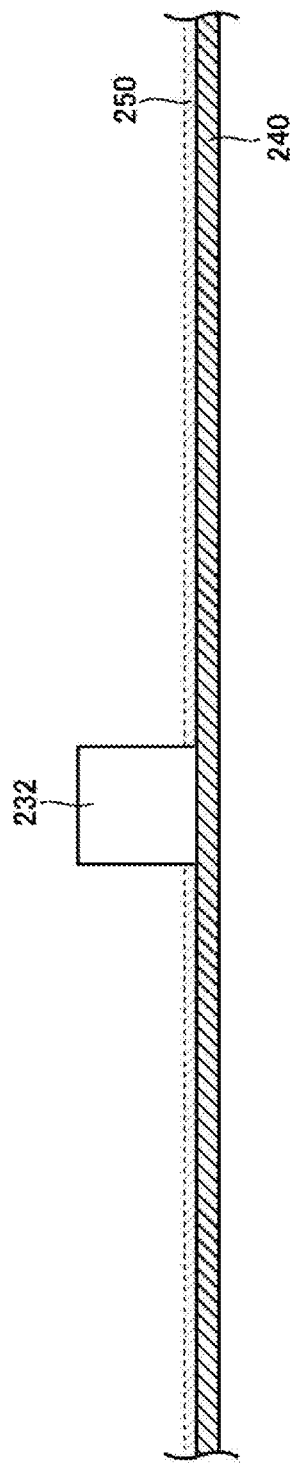
FIG. 12 is a schematic diagram describing a landing detection range defined when the landing detection height is set to zero in the simulator according to the embodiment.

FIG. 12 is a schematic diagram describing a landing detection range defined when the landing detection height is set to zero in the simulator 100 according to the present embodiment. As shown in FIG. 12, an area within which workpiece landing is detected at a predetermined height (corresponding to the object 250 shown in FIG. 10) is defined above the conveyor 240 (workpiece placement conveyor), although the landing detection height is set to zero. The height of this area is determined in accordance with the accuracy in position management for the system model.

The margin is set for the landing detection height to prevent an erroneous determination in determining whether the workpiece has contacted the conveyor (contact detection), or specifically to prevent a workpiece released from the robot at a position nearly contacting the conveyor from being determined not to contact the conveyor.

G. Detecting Contact with Another Workpiece

The processing for determining whether a workpiece has contacted another workpiece (processing in the second half part of step S28 in FIG. 8) will now be described in detail. As described with reference to FIG. 3B, one workpiece may be placed on another workpiece that has already been placed on the transporting surface.

Figure 13A:
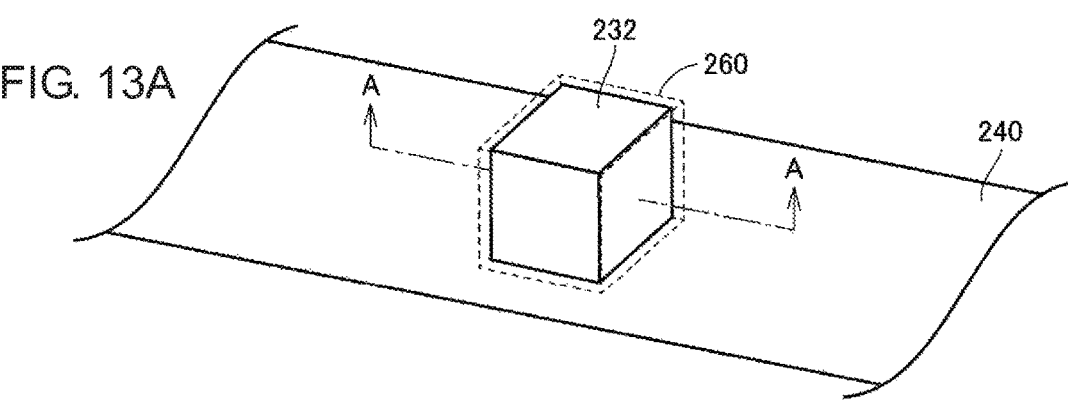
FIGS. 13A and 13B are schematic diagrams describing a contact detection margin used in the simulator according to the embodiment.
Figure 13B:
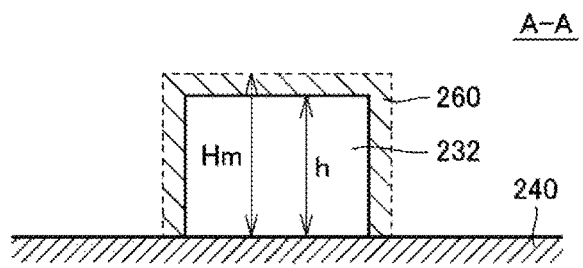

FIGS. 13A and 13B are schematic diagrams describing a contact detection margin used in the simulator 100 according to the present embodiment. With reference to FIG. 13A, the workpiece 232 placed on the transporting surface of the conveyor has a contact detection margin surrounding the workpiece 232 as a tolerance for detecting contact with another workpiece. When another workpiece enters an area 260 defined by the contact detection margin, the two workpieces are associated with each other and are moved in synchronization with the conveyor. In the same manner as for the object 250 representing an area defined by the landing detection height shown in FIG. 10, the area 260 may be visualized by using a semitransparent object. The visualization allows the user to readily check the area defined by the contact detection margin.

As described above, the defined contact detection margin surrounds the workpiece 232. In a system for placing multiple workpieces in a single container, for example, a target workpiece may not be placed exactly on the previously placed workpiece but may simply be placed near the previous workpiece. In that system, a workpiece 232 may have a contact detection margin on its periphery in addition to its top surface. In a system in which workpieces 232 are oriented randomly on the transporting surface of the conveyor, a workpiece 232 may have a contact detection margin along the entire periphery, rather than having a contact detection margin only on its particular surface. In an application for stacking workpieces on one another, a workpiece 232 may have a contact detection margin only on its top surface.

FIG. 13B is a cross-sectional view taken along line A-A in FIG. 13A. The size of the detection area including the contact detection margin (area height Hm) may be determined freely or may be determined in accordance with the height of the workpiece 232. For example, the contact detection margin may be determined in accordance with the height of the workpiece 232 within a three-dimensional virtual space. For example, the area height Hm can be calculated by multiplying the height of the workpiece 232 by a constant using the formulas below.

Area height $Hm = \alpha \times$ workpiece height $h$

Contact detection margin $= (\alpha - 1) \times$ workpiece height $h$ where $\alpha > 1$ (const)

The user may also freely set the contact detection margin in the same manner as for the user interface screen shown in FIGS. 11A and 11B.

Further, contact detection margins may be set separately for different surfaces of a workpiece, or for different types (e.g., different items or different shapes) of workpieces.

Figure 14:
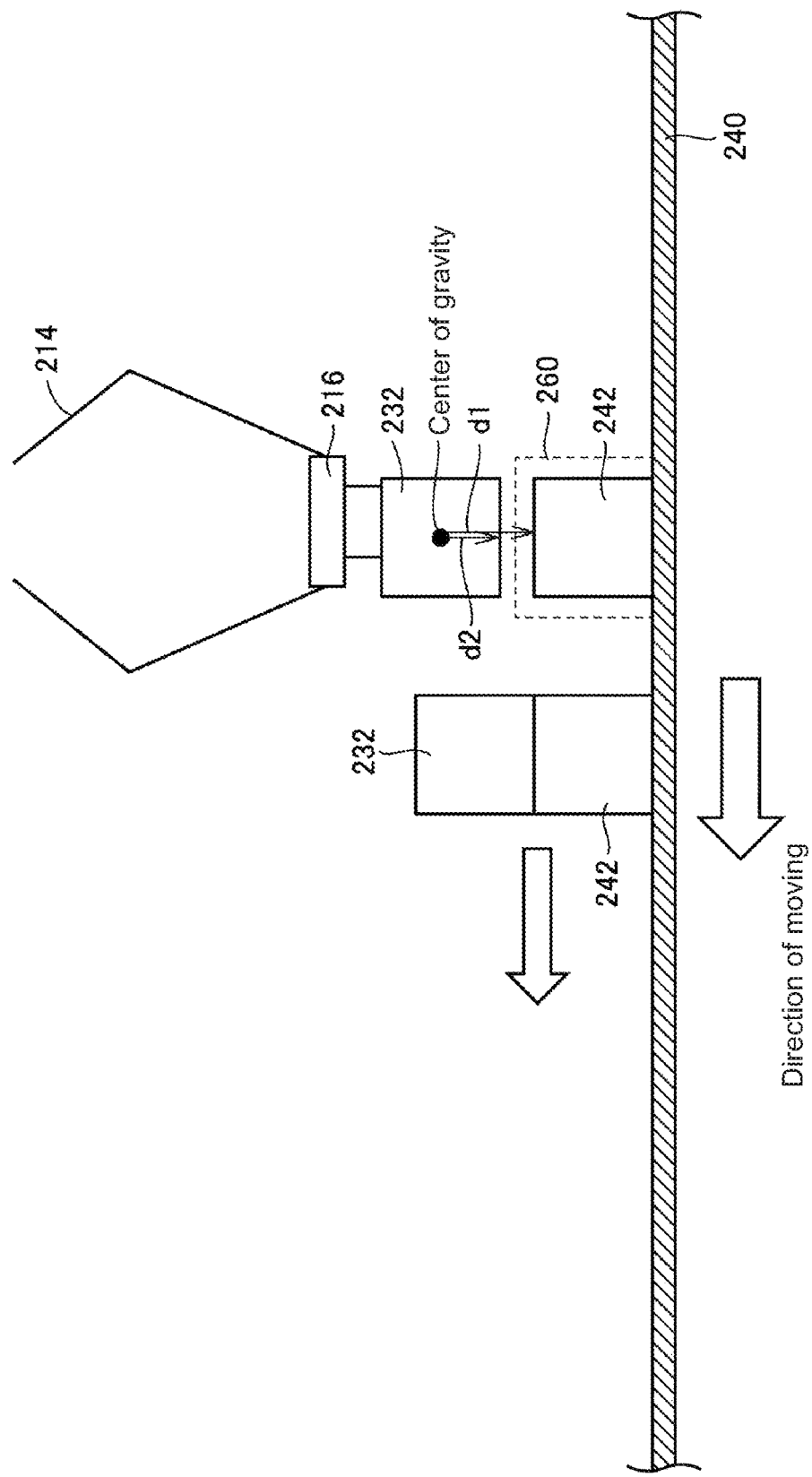
FIG. 14 is a schematic diagram describing an overview of detection of contact with another workpiece in the simulator according to the embodiment.

FIG. 14 is a schematic diagram describing an overview of detection of contact with another workpiece in the simulator according to the present embodiment. With reference to FIG. 14, when the robot tool 216 arranged at the end of the robotic arm 214 releases the workpiece 232, the distance to the workpiece 242 placed under the workpiece 232 is calculated. The workpiece 232 entering the area 260 of the workpiece 242 defined by the contact detection margin is determined to be in contact with the workpiece 242.

With one example procedure, distances d1 and d2 from the center of gravity of the workpiece 232 are calculated. The distance d1 is from the center of gravity of the workpiece 232 to the workpiece 242 immediately below the center of gravity. The distance d2 is from the center of gravity of the workpiece 232 to the bottom of the same workpiece 232. When the difference between the distances d1 and d2 is equal to or less than the contact detection margin, the workpiece 232 is determined to be in contact with the workpiece 242. In this case, the workpieces 232 and 242 are moved as a single unit in synchronization with the conveyor 240.

Figure 15:
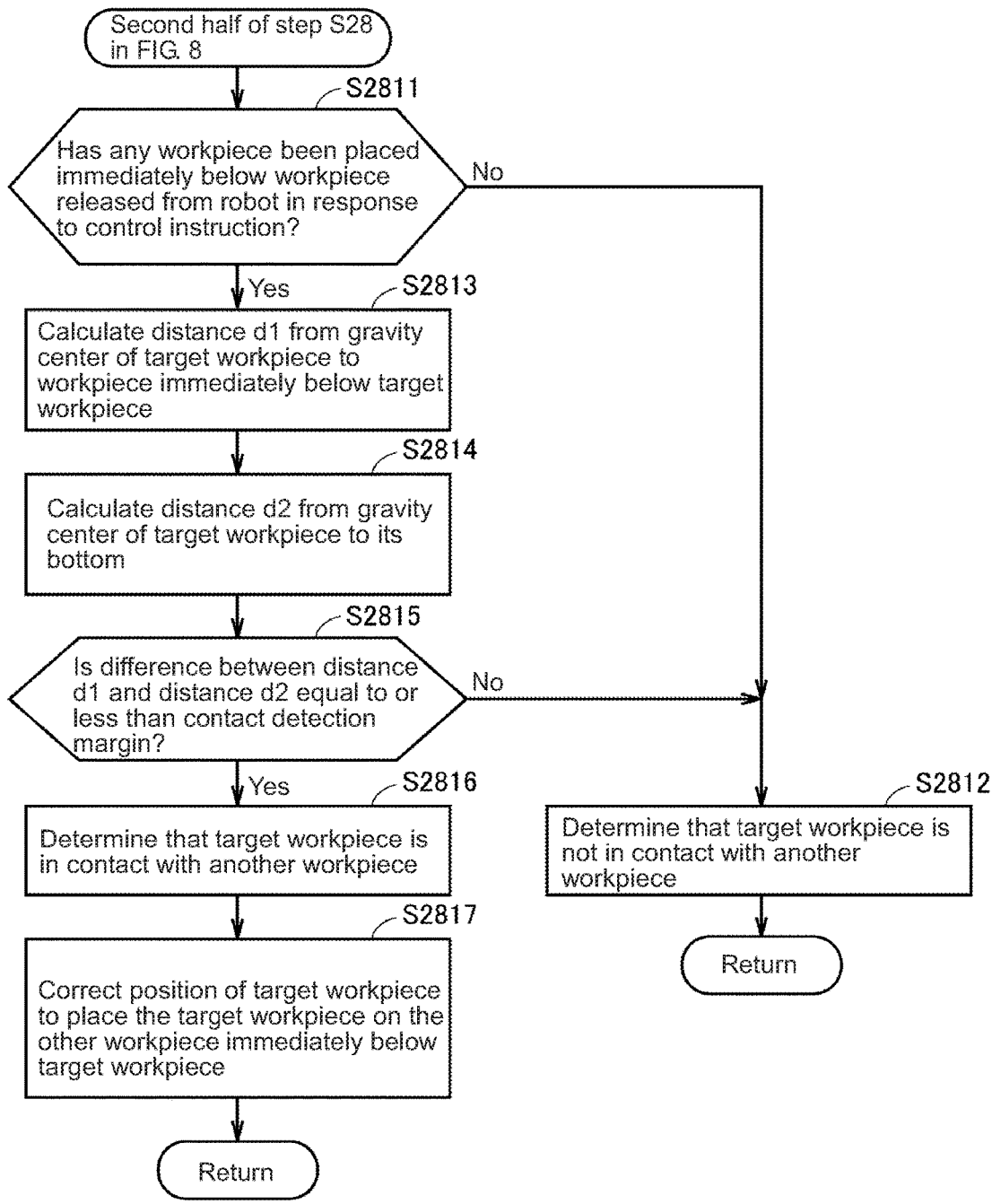
FIG. 15 is a flowchart showing the detailed procedure for the second half part of step S28 in FIG. 8.

FIG. 15 is a flowchart showing the detailed procedure for the second half part of step S28 in FIG. 8. With reference to FIG. 15, the simulator 100 determines whether any workpiece has been placed immediately below the workpiece released from the robot in response to the control instruction (step S2811). When no such workpiece has been placed (No in step S2811), the simulator 100 determines that the workpiece released from the robot in response to the control instruction is not in contact with another workpiece (step S2812). The processing then returns to step S28 and subsequent steps in FIG. 8.

When any workpiece has been placed immediately below the workpiece released from the robot in response to the control instruction (Yes in step S2811), the simulator 100 calculates the distance d1 from the center of gravity of the target workpiece to the workpiece immediately below the target workpiece (step S2813), and also calculates the distance d2 from the center of gravity of the target workpiece to the bottom of the same target workpiece (step S2814). The simulator 100 then determines whether the difference between the distances d1 and d2 is equal to or less than the contact detection margin (step S2815).

When the difference between the distances d1 and d2 is equal to or less than the contact detection margin (Yes in step S2815), the simulator 100 determines that the target workpiece is in contact with another workpiece (step S2816). The simulator 100 corrects the position of the target workpiece to place the target workpiece on the workpiece immediately below the target workpiece (step S2817). More specifically, the position of the workpiece 232 is updated to eliminate a certain distance left between the workpiece 232 and the workpiece 242 as shown in FIG. 14. The processing then returns to step S28 and subsequent steps in FIG. 8.

When the difference between the distances d1 and d2 is greater than the contact detection margin (No in step S2815), the simulator 100 determines that the workpiece released from the robot in response to the control instruction is not in contact with another workpiece (step S2812). The processing then returns to step S28 and subsequent steps in FIG. 8.

Through the processing described above, the simulator determines whether one workpiece has contacted another workpiece. When determining that one workpiece has contacted another workpiece, the simulator places the target workpiece on the other workpiece, and these workpieces move in synchronization with the conveyor.

Figure 16A:
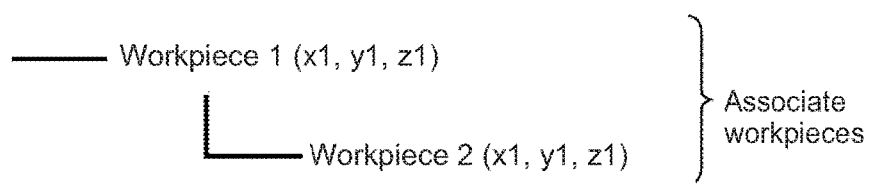
FIGS. 16A to 16C are schematic diagrams describing associations between workpieces in the simulator according to the embodiment.
Figure 16B:
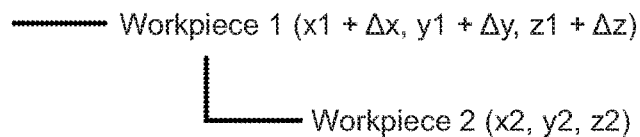
Figure 16C:
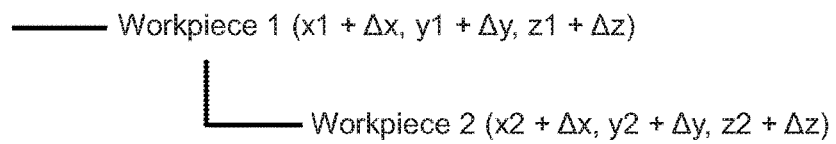

FIGS. 16A to 16C are schematic diagrams describing associations between workpieces in the simulator according to the present embodiment. With reference to FIG. 16A, when the workpiece 1 is associated with the workpiece 2, the positions of the two workpieces undergo the same variations. In the example shown in FIGS. 16A to 16C, the workpiece 1 is at the coordinates (x1, y1, z1) and the workpiece 2 at the coordinates (x2, y2, z2) at a given timing. As shown in FIG. 16B, an event causes the coordinates of the workpiece 1 to change from (x1, y1, z1) to (x1+Δx, y1+Δy, z1+Δz). In this case, the coordinates of the workpiece 2 undergo the same variation (Δx, Δy, Δz). As a result, the coordinates of the workpiece 2 change from (x2, y2, z2) to (x2+Δx, y2+Δy, z2+Δz) as shown in FIG. 16C.

As described above, when the robot places the second workpiece in a predetermined range (contact detection margin) from the surface of the first workpiece determined to have been placed on any transporting surface, the simulator 100 according to the present embodiment updates the positions of the first workpiece and the second workpiece in a manner associated with each other. Through the processing shown in FIGS. 16A to 16C for the associated workpieces, the multiple workpieces can be moved as a single unit.

H. Priority for Associations Between Objects

As described above, the simulator 100 according to the present embodiment can update the position of each workpiece in a manner associated with the transporting surface, or in a manner associated with another workpiece. However, at the timing of landing detection and contact detection, one workpiece determined to have landed on the transporting surface can possibly be determined to have contacted another workpiece. In this case, the priorities may be assigned to objects with which the target workpiece is to be associated.

For example, when the workpiece 232 determined to have landed on the workpiece placement conveyor 240 is also determined to have contacted another workpiece placed on the workpiece placement conveyor 240, the workpiece 232 may be associated with the conveyor 240 with a higher priority, or the workpiece 232 may be associated with the other workpiece with a higher priority than with the conveyor 240.

The priority may be set to 1 for the workpiece placement conveyor 240, and may be set to 2 for the other workpiece. When multiple objects are detected in the landing detection and the contact detection, an object having the higher priority may be selected. This structure prevents the workpiece from being associated with an unintended object.

In this manner, when the robot 210 places a workpiece in an area including both the transporting surface and another target, the simulator 100 according to the present embodiment can associate the workpiece with either the transporting surface or the other workpiece in accordance with their predefined priorities.

I. Updating Workpiece Position

The processing for updating the workpiece position in the simulator 100 according to the present embodiment will now be described. In the simulator 100 according to the present embodiment, the visualization module 170 (FIG. 7) performs image measurement to search an input image for a workpiece, and the detected workpiece appears in a three-dimensional virtual space.

The measurement results of image measurement include the coordinates (x, y) indicating the center of a part (object) detected in the input image. The coordinates (x, y), which are values in a local coordinate system used for image measurement, are to be transformed into the coordinates in a three-dimensional virtual space.

More specifically, the simulator 100 can use transform coefficients A to G for transforming the coordinates (x, y) of an input image defined in the camera coordinate system used in image measurement into the coordinates (X, Y, Z) defined in a world coordinate system defining the three-dimensional virtual space. The simulator 100 can thus calculate the initial position at the input into the controller simulator 160 based on the workpiece coordinates (x, y) detected in the visual sensor simulator 150 in the manner described below.

Workpiece initial position $X0=A \times x + B \times y + C$

Workpiece initial position $Y0=D \times x + E \times y + F$

Workpiece initial position $Z0=G$

A movement Xd of the conveyor in X-direction, a movement Yd of the conveyor in Y-direction, and a movement Zd of the conveyor (typically, zero) in Z-direction per pulse of an encoder value can be used to calculate the workpiece position corresponding to a displacement Et indicated by the encoder value as written in the formulas below.

Workpiece position $(X)=Xd \times Et + X0$

Workpiece position $(Y)=Yd \times Et + Y0$

Workpiece position $(Z)=Zd \times Et + Z0$

When the absolute value of an encoder value is used, a deviation from the encoder value for each workpiece displayed initially may be incorporated in these formulas. The simulator 100 sequentially updates the position of each workpiece in accordance with these formulas.

J. Additional Objects

In the application described above, multiple workpieces are associated with each other and moved in synchronization with the conveyor. Specific examples of this application include placing multiple workpieces in a single container. In visualizing the simulation of this application, the container may also be displayed.

Figure 17:
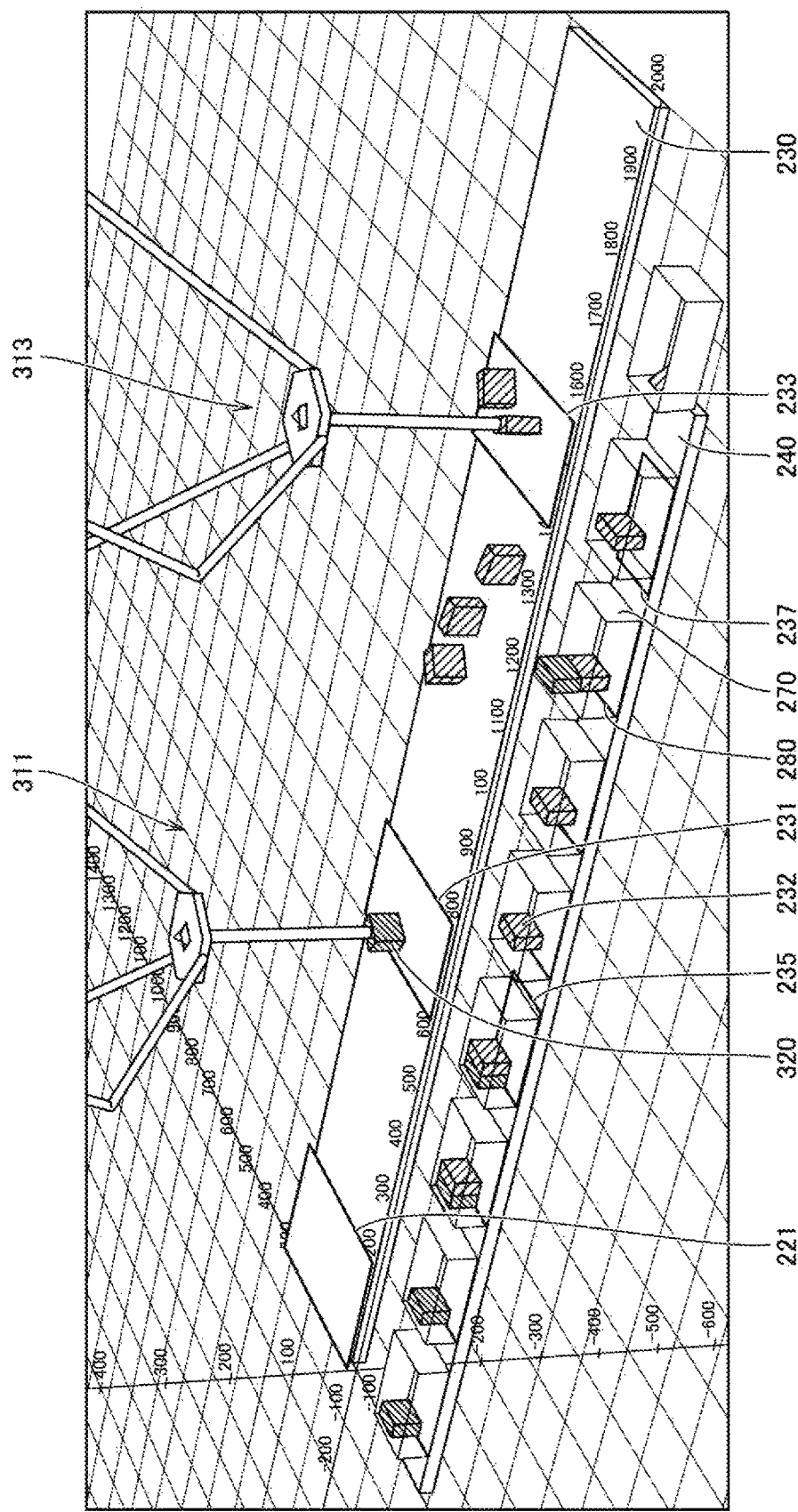
FIG. 17 is a diagram showing visualizing simulation results obtained from the simulator according to the embodiment.

FIG. 17 is a diagram showing visualizing simulation results obtained from the simulator 100 according to the present embodiment. With reference to FIG. 17, multiple objects 270 corresponding to containers are displayed on the conveyor 240 at intervals preset by the user. The intervals between the objects 270 are, for example, preset based on required specifications (including a tact time). When simulation results are reproduced, the objects 270 appear on the conveyor 240 at the preset intervals.

The positions of the objects 270 may serve as references used for positioning workpieces. In addition to the objects 270, reference lines 280 may also be displayed.

The shape, color, and size of the objects 270 may be freely preset by the user. Further, the objects 270 may be transparent or semitransparent to allow the user to readily check the positional relationship between the objects 270 and the workpieces 232.

As shown in FIG. 17, the additional objects 270 and/or the reference lines 280 are virtually displayed in addition to the workpieces 232 to allow the user to visually evaluate whether the workpieces are processed as designed.

K. Correcting Workpiece Position in Height Direction

Correcting the position of a workpiece in the height direction will now be described. As described with reference to FIGS. 4 and 5, when a workpiece is released within the range of the landing detection height from the transporting surface of the conveyor, the workpiece is determined to have landed on the conveyor and then moved in synchronization with the conveyor.

The workpiece may retain its height after released, or may be corrected in the height direction to place the workpiece on the transporting surface of the conveyor.

FIG. 18 is a schematic diagram describing position corrections in the height direction in the simulator according to the present embodiment. With reference to FIG. 18, when the workpiece 232 is released at or below the landing detection height from the conveyor, its position in the height direction is corrected to place the workpiece on the transporting surface of the conveyor. The workpiece is then moved in synchronization with the conveyor 240.

As shown in FIG. 18, when the robot places the workpiece within the range of the landing detection height from the transporting surface of the conveyor, the simulator 100 (system model emulator 190 in FIG. 7) may update the position of the workpiece in the height direction in the three-dimensional virtual space to bring the workpiece in contact with the transporting surface. Correcting the workpiece position in the height direction allows simulation of the behavior nearer the reality. This position correction may also be used for simulating stacking of multiple workpieces.

L. Correcting Workpiece Position Based on Robot Moving

Correcting the position of a workpiece based on the behavior of the robot during placement of the workpiece will now be described. In an actual pick-and-place operation, the robot moves horizontally at the moving speed of the conveyor on which the workpiece is to be placed, immediately before placing the workpiece. In other words, the robot releases the workpiece after minimizing the relative velocity of the robot and the conveyor to nearly zero.

Figure 19A:
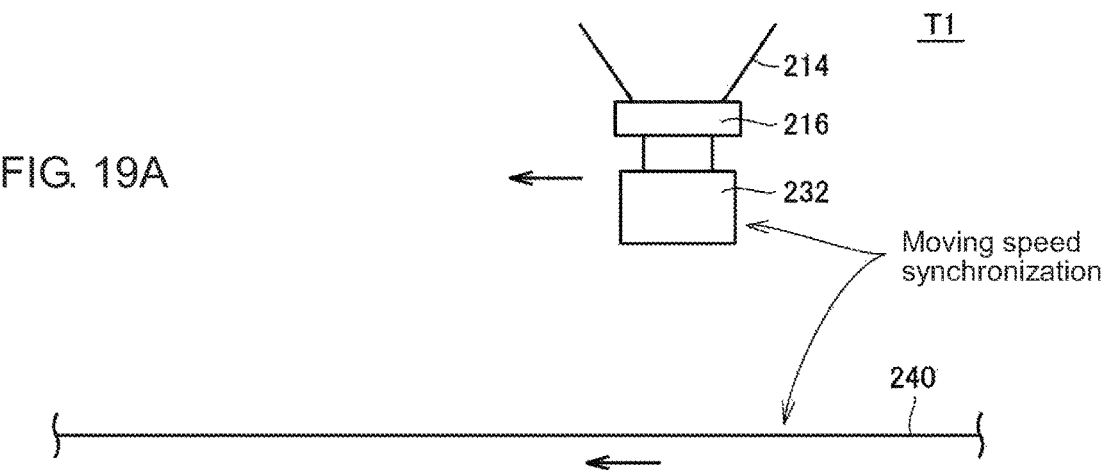
FIGS. 19A to 19C are schematic diagrams describing the process for correcting workpiece positions in the simulator according to the embodiment.
Figure 19B:
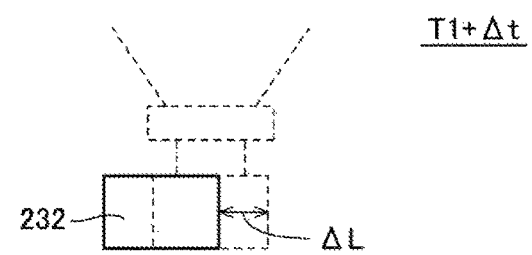
Figure 19C:
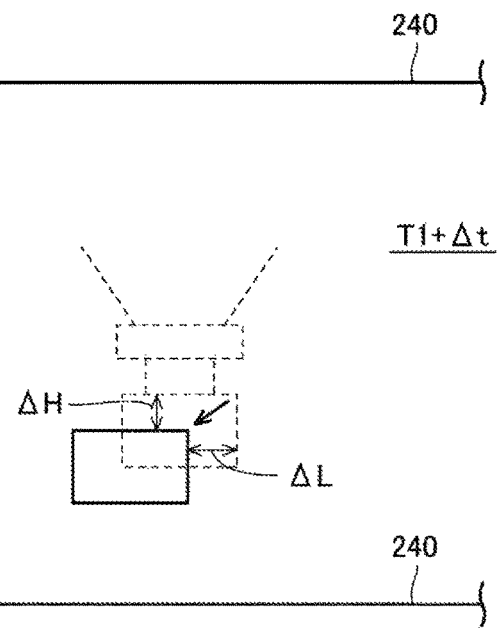

FIGS. 19A to 19C are schematic diagrams describing the process for correcting workpiece positions in the simulator 100 according to the present embodiment. With reference to FIG. 19A, the robot moves horizontally in synchronization with the moving speed of the conveyor 240 immediately before placing the workpiece (at time T1).

As shown in FIG. 19B, immediately after the robot tool 216 arranged at the end of the robotic arm 214 releases the workpiece (at T1+Δt), the workpiece is expected to have moved horizontally by a certain distance (ΔL) under the inertial force acting from the preceding horizontal movement of the robot.

Thus, the position of the workpiece released from the robot may be corrected using the horizontal offset (distance ΔL), and then the simulator may determine whether the workpiece has landed on the transporting surface of the conveyor. More specifically, the simulator 100 (system model emulator 190 shown in FIG. 7) may correct the workpiece position horizontally in the three-dimensional virtual space in accordance with the velocity of the robot in the horizontal direction in the three-dimensional virtual space when the robot releases the workpiece.

As shown in FIG. 19C, immediately after the robot tool 216 arranged at the end of the robotic arm 214 releases the workpiece (at T1+Δt), the workpiece is precisely expected to move horizontally by a certain distance (ΔL) under the inertial force acting from the preceding horizontal movement of the robot and move vertically by a certain distance (ΔH) under its weight.

Thus, the position of the workpiece when released from the robot may be corrected using the horizontal offset (distance ΔL) and the vertical offset (distance ΔH), and then the simulator may determine whether the workpiece has landed on the transporting surface of the conveyor.

For the correction using the offsets shown in FIGS. 19B and 19C, the offsets may be variable and calculated based on the preceding moving speed of the robot (and the acceleration as appropriate). To reduce the computational complexity, the offsets may be predetermined fixed values.

The correction enables the simulation reflecting the behavior nearer the reality.

M. Other Embodiments

In the above embodiment, the robot picks up a workpiece continuously transported on the workpiece pickup conveyor, transfers the workpiece to the workpiece placement conveyor, and places the workpiece onto the workpiece placement conveyor. The embodiment is not limited to this structure in which workpieces to be picked up are transported continuously on the workpiece pickup conveyor. The embodiment also covers an application in which the robot picks up a designated workpiece or any workpiece from multiple workpieces that are stationary (e.g., multiple workpieces stacked on one another).

N. Advantages

The simulator 100 according to the embodiments allows a workpiece to be tracked correctly in synchronization with movement of the conveyor in, for example, the conveyor system with the pick-and-place operation with which a workpiece may be released above the transporting surface of the conveyor and placed onto the transporting surface.

The simulator 100 according to the embodiments further allows workpieces to be associated with each other and tracked correctly in synchronization with movement of the conveyor in the conveyor system in which one workpiece is already placed on the transporting surface of the conveyor and another workpiece is released from the robot at a position near the already placed workpiece.

The embodiments disclosed herein should be considered to be in all respects illustrative and not restrictive. The scope of the present invention is determined not by the description given above but by the claims, and is construed as including any modification that comes within the meaning and range of equivalency of the claims.

REFERENCE SIGNS LIST 1, 2 conveyor tracking system
232, 242 workpiece
100 simulator
102 processor
104 main memory
106 input unit
108 display unit
110 network interface
112 optical drive
114 optical disc
116 communication interface
118 internal bus
120 hard disk drive
122 OS
124 simulation program
140 image data group
150 visual sensor simulator
152 setting parameter
160 controller simulator
162 control program
170 visualization module
180 user interface module
182 model creating module
184 three-dimensional design data
190 system model emulator
192 object attribute information
200 controller
202 network
210, 311, 313 robot
214 robotic arm
216 robot tool
220 visual sensor
221 imaging area
222 imaging unit
230, 240 conveyor
231, 233, 235 tracking area
234, 244 drive roller
236, 246 encoder
250, 270 object
260 area
280 reference line

The invention claimed is:

1. A simulator for estimating a behavior of a system comprising a carrier having a transporting surface for continuously transporting a target that is placed thereon and a processing device for picking up and placing the target onto the transporting surface, the simulator comprising:
a processor configured with a program to perform operations comprising:
operation as a creating unit configured to virtually create the system in a three-dimensional virtual space;
operation as a tracking unit configured to update positions of a plurality of targets placed on the transporting surface in the three-dimensional virtual space based on a corresponding movement of the carrier, and update a position of the target picked up by the processing device in the three-dimensional virtual space in a manner associated with a behavior of the processing device; and operation as an instruction generation unit configured to generate a control instruction for the behavior of the processing device based on a position of each target of the plurality of targets in the three-dimensional virtual space, wherein the processor is configured with the program to perform operations such that:

in response to the processing device placing the target within a predetermined range from the transporting surface, operation as the tracking unit comprises operation as the tracking unit configured to associate the target with the transporting surface and update the position of the target and operation as the tracking unit comprises operation as the tracking unit configured to correct the position of the target in a horizontal direction in the three-dimensional virtual space in accordance with a transporting speed in the horizontal direction in the three-dimensional virtual space at a timing in response to the processing device releasing the target.

2. The simulator according to claim 1, wherein
the processor is configured with the program to perform operations such that, in response to the processing device placing a first target within a predetermined range from a surface of a second target determined to have been placed on a part of the transporting surface, operation as the tracking unit comprises operation as the tracking unit configured to associate a position of the first target and a position of the second target with each other and update the positions of the first target and the second target.

3. The simulator according to claim 2, wherein
the processor is configured with the program to perform operations such that operation as the tracking unit comprises operation as the tracking unit configured to determine a size of the predetermined range from the surface of the second target in accordance with a height of the second target in the three-dimensional virtual space.

4. The simulator according to claim 1, wherein
the processor is configured with the program to perform operations further comprising operation as an input unit configured to receive a setting for a size of the predetermined range.

5. The simulator according to claim 1, wherein
in the three-dimensional virtual space, an area indicating the predetermined range is expressed by using a semi-transparent object.

6. The simulator according to claim 1, wherein
the processor is configured with the program to perform operations such that, in response to the processing device places the target within the predetermined range from the transporting surface, operation as the tracking unit comprises operation as the tracking unit configured to update a position of the target in a height direction in the three-dimensional virtual space to bring the target into contact with the transporting surface.

7. The simulator according to claim 2, wherein
the processor is configured with the program to perform operations such that, in response to the processing device placing the target within a range comprising the transporting surface and the second target, operation as the tracking unit comprises operation as the tracking unit configured to associate the target with one of the transporting surface and the second target based on predetermined priorities.

8. The simulator according to claim 1, wherein
the processor is configured with the program to perform operations further comprising operation as a measurement unit configured to perform image measurement of an input image comprising at least a part of the target as a subject of the input image associated with an area predefined on the transporting surface in the three-dimensional virtual space, and the processor is configured with the program to perform operations such that, in response to detection of the target by the measurement unit, operation as the tracking unit comprises operation as the tracking unit configured to display the detected target in the three-dimensional virtual space.

9. A simulation method implemented by a computer for estimating a behavior of a system comprising a carrier having a transporting surface for continuously transporting a target that is placed thereon and a processing device for picking up and placing the target onto the transporting surface, the method comprising:

virtually creating the system in a three-dimensional virtual space;

updating positions of a plurality of targets placed on the transporting surface in the three-dimensional virtual space based on a corresponding movement of the carrier, and updating the position of the target picked up by the processing device in the three-dimensional virtual space in a manner associated with a behavior of the processing device;

generating a control instruction for the behavior of the processing device based on a position of each target of the plurality of targets in the three-dimensional virtual space; and correcting the position of the target in a horizontal direction in the three-dimensional virtual space in accordance with a transporting speed in the horizontal direction in the three-dimensional virtual space at a timing in response to the processing device releasing the target, wherein updating the positions comprises, in response to the processing device placing the target within a predetermined range from the transporting surface, associating the target with the transporting surface and updating the position of the target.

10. A non-transitory computer readable medium storing a simulation program for estimating a behavior of a system comprising a carrier having a transporting surface for continuously transporting a target that is placed thereon and a processing device for picking up and placing the target onto the transporting surface, the simulation program, when read and executed, causing a computer to implement:

virtually creating the system in a three-dimensional virtual space;

updating positions of a plurality of targets placed on the transporting surface in the three-dimensional virtual space based on a corresponding movement of the carrier, and updating the position of the target picked up by the processing device in the three-dimensional virtual space in a manner associated with a behavior of the processing device;

generating a control instruction for the behavior of the processing device based on a position of each target of the plurality of targets in the three-dimensional virtual space; and correcting the position of the target in a horizontal direction in the three-dimensional virtual space in accordance with a transporting speed in the horizontal direction in the three-dimensional virtual space at a timing in response to the processing device releasing the target, wherein updating the positions comprises, in response to the processing device placing the target within a predetermined range from the transporting surface, associating the target with the transporting surface and updating the position of the target.

\* \* \* \* \*